United States Patent
Chatterjee

(10) Patent No.: US 6,567,777 B1
(45) Date of Patent: May 20, 2003

(54) EFFICIENT MAGNITUDE SPECTRUM APPROXIMATION

(75) Inventor: Manjirnath Chatterjee, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 223 days.

(21) Appl. No.: 09/630,885

(22) Filed: Aug. 2, 2000

(51) Int. Cl.[7] ................................................ G10L 15/00
(52) U.S. Cl. ...................... 704/246; 704/250; 704/270
(58) Field of Search .............................. 704/205, 211, 704/221, 222, 270, 275, 231, 246, 250, 255; 708/201, 511, 520, 605, 807

(56) References Cited

U.S. PATENT DOCUMENTS

| | | | |
|---|---|---|---|
| 4,599,701 A | * | 7/1986 | Vojir et al. ................. 364/752 |
| 4,646,173 A | | 2/1987 | Kammeyer et al. |
| 4,656,648 A | | 4/1987 | Vallet |
| 4,747,067 A | * | 5/1988 | Jagodnik, Jr. et al. ...... 364/715 |
| 4,945,505 A | * | 7/1990 | Wiener et al. ......... 364/715.03 |
| 4,956,865 A | | 9/1990 | Lennig et al. |
| 5,175,617 A | * | 12/1992 | Wallace et al. .............. 358/133 |
| 5,459,681 A | | 10/1995 | Harrison et al. |
| 5,847,979 A | | 12/1998 | Wong et al. |
| 6,092,039 A | * | 7/2000 | Zingher ...................... 704/221 |
| 6,115,684 A | * | 9/2000 | Kawahara et al. .......... 704/203 |

FOREIGN PATENT DOCUMENTS

| | | |
|---|---|---|
| DE | 3825160 A1 | 1/1990 |
| EP | 0 825 545 A1 | 2/1998 |

* cited by examiner

*Primary Examiner*—Susan McFadden
(74) *Attorney, Agent, or Firm*—Hisashi D. Wantanabe

(57) ABSTRACT

Methods and systems for efficient magnitude approximation, for example, for approximation of magnitudes of complex rectilinear Fourier transform coefficients in portable or other low-power speech recognition equipment, and for cartesian-to-polar coordinate transforms.

6 Claims, 10 Drawing Sheets

FIG. 3A
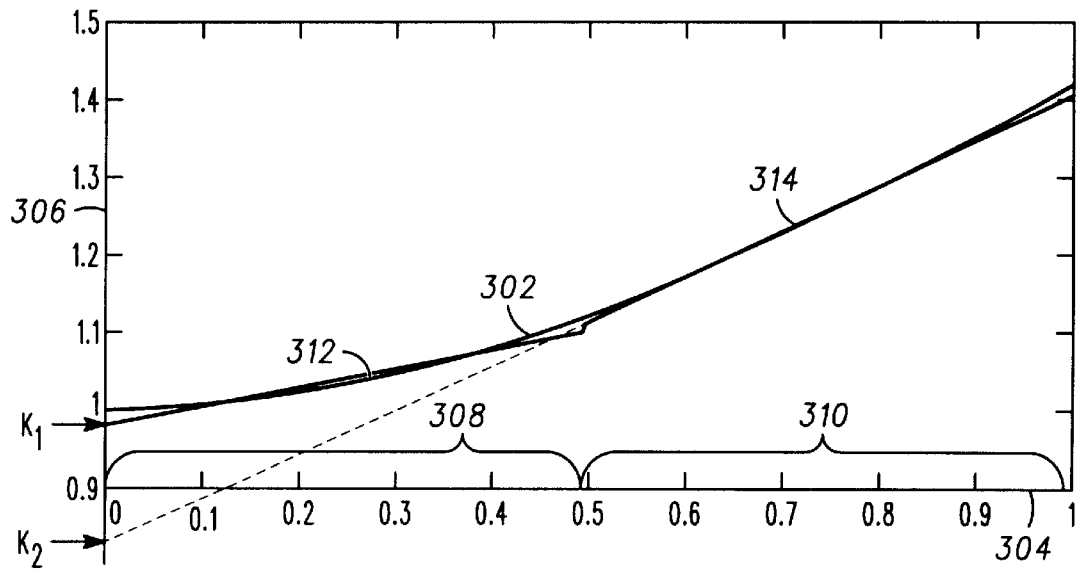
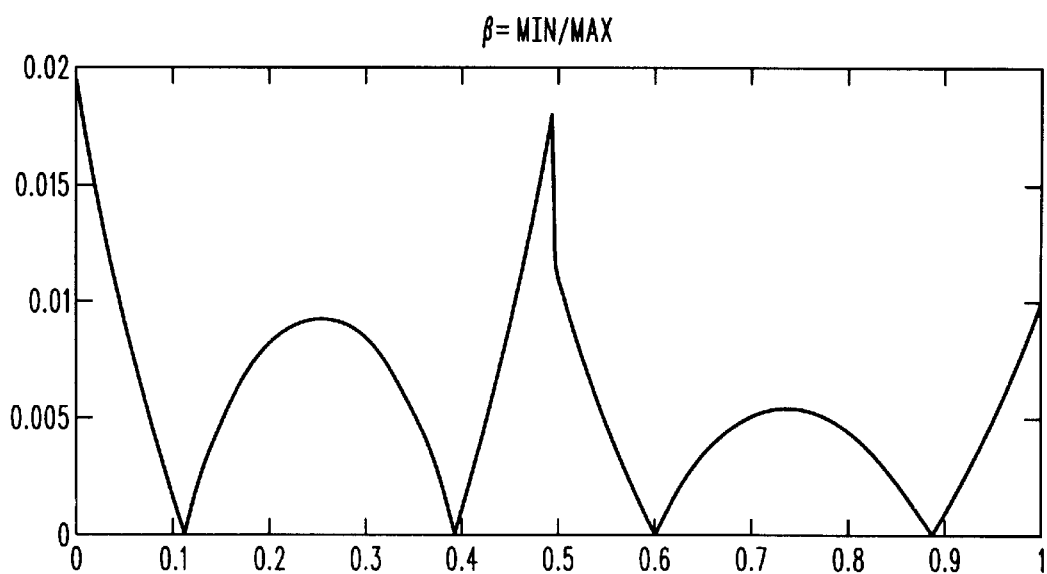

FIG.3B
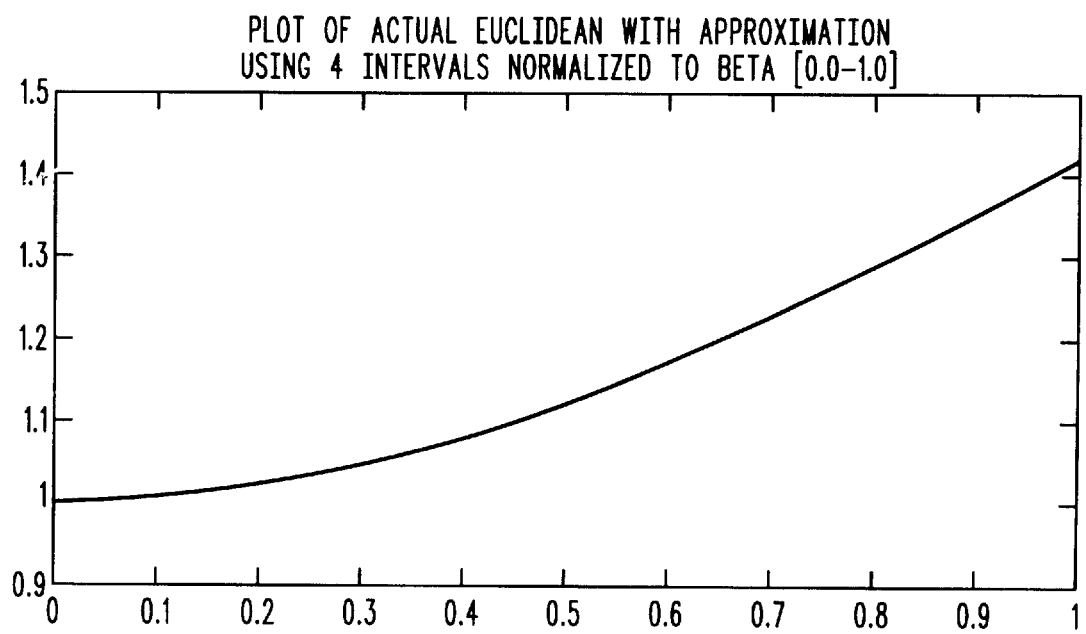
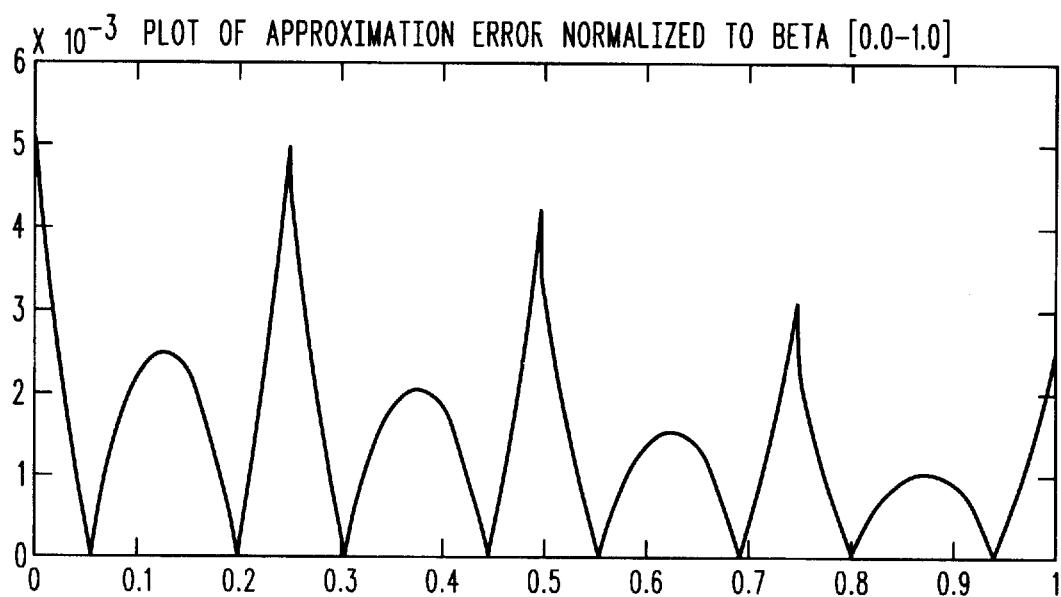

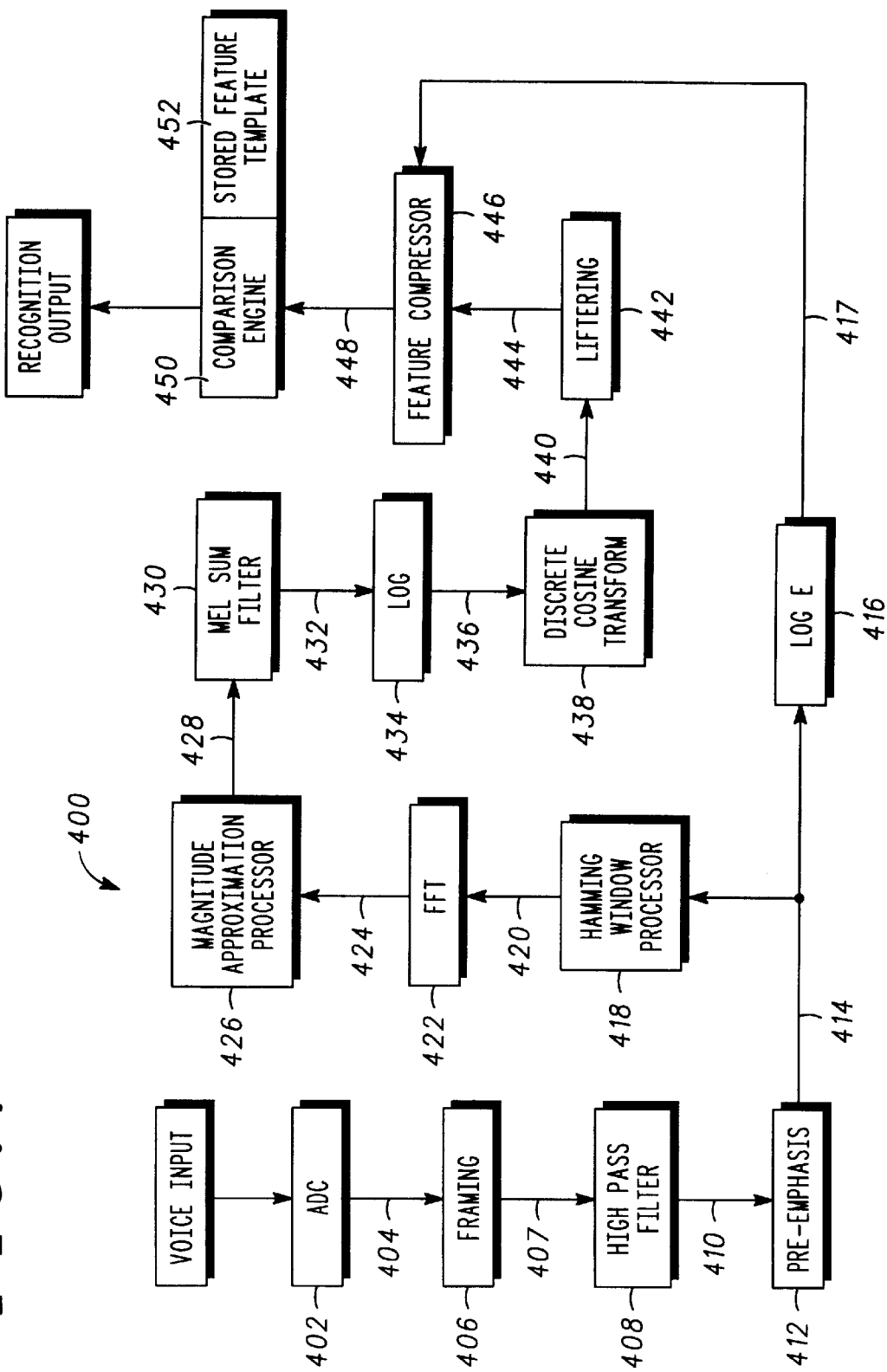

FIG. 8A
PLOT OF ACTUAL ARCTAN WITH APPROXIMATION USING
2 INTERVALS NORMALIZED TO BETA [0.0–1.0]
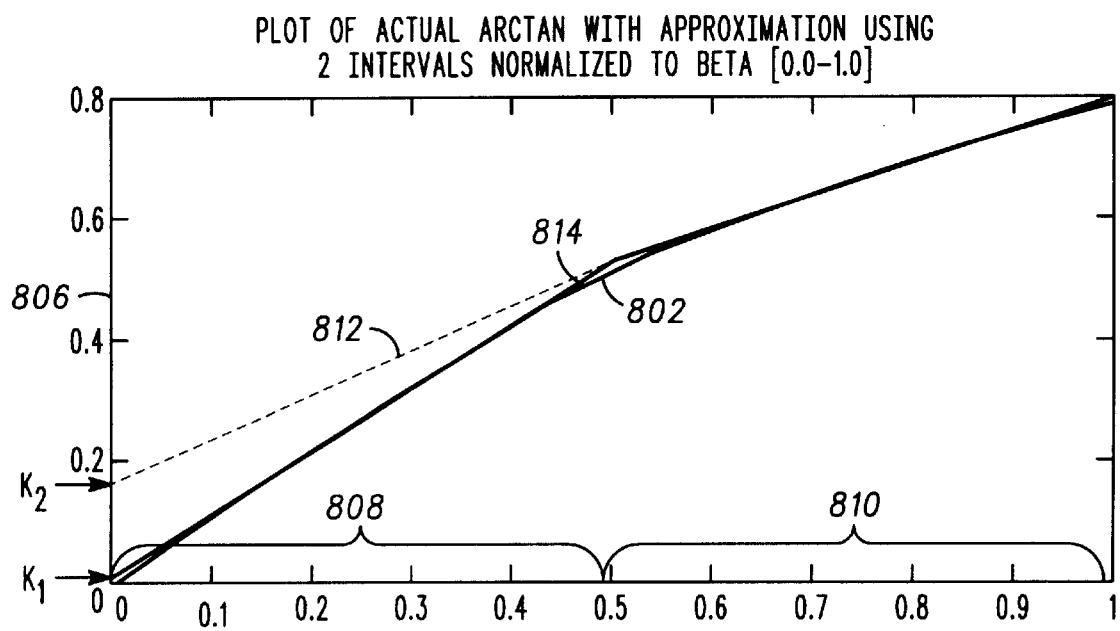
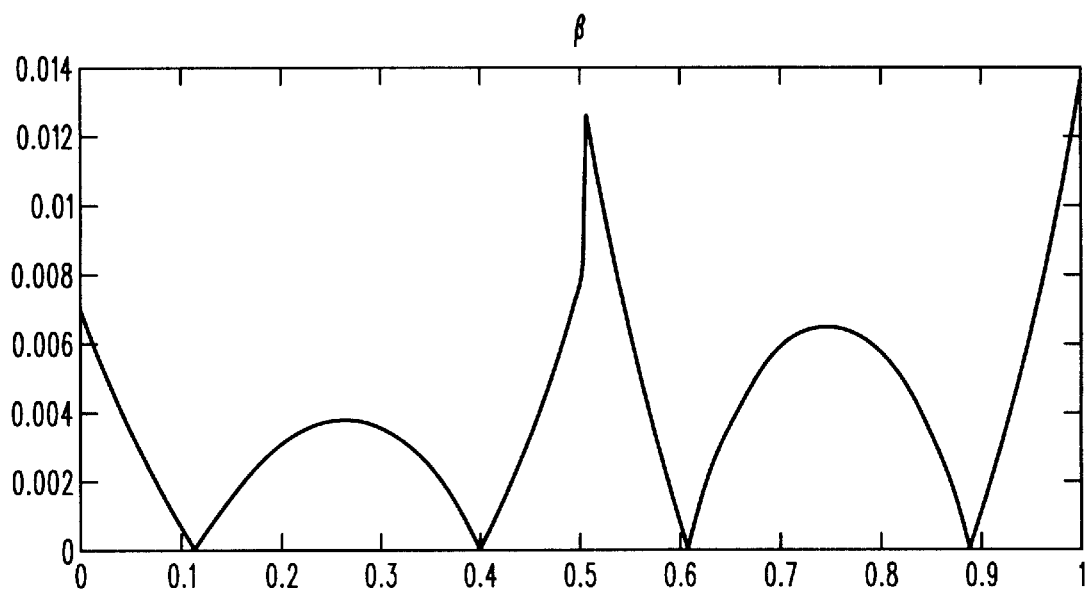

FIG. 8B
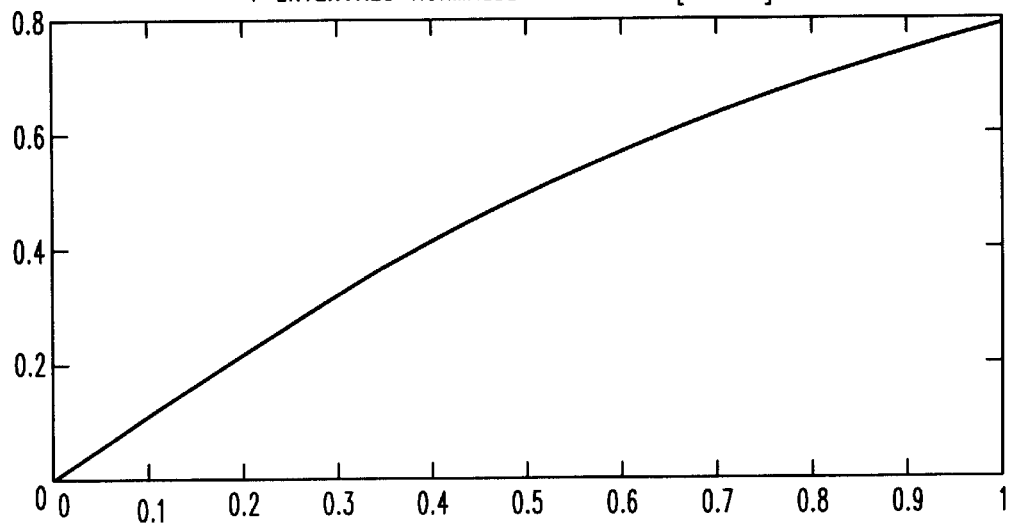
PLOT OF ACTUAL ARCTAN WITH APPROXIMATION USING 4 INTERVALS NORMALIZED TO BETA [0.0-1.0]
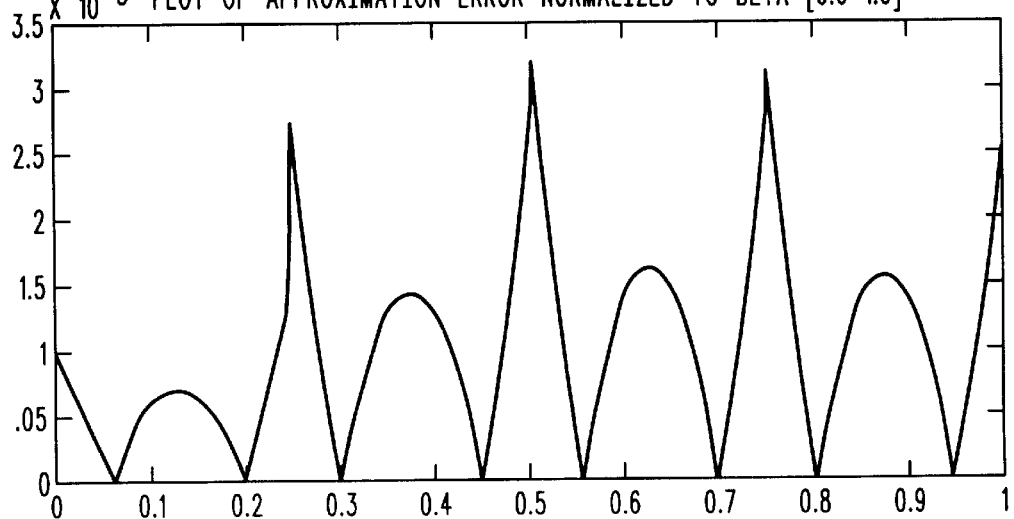
x $10^{-3}$ PLOT OF APPROXIMATION ERROR NORMALIZED TO BETA [0.0-1.0]

EFFICIENT MAGNITUDE SPECTRUM APPROXIMATION

FIELD OF THE INVENTION

The present invention is directed to methods and apparatus for rapid and efficient approximation of magnitude spectra, for uses such as speech and other pattern recognition and processing, as well as more generalized two-dimensional and three-dimensional Euclidean vector (magnitude and/or phase) approximation for coordinate transforms and other applications.

BACKGROUND OF THE INVENTION

Magnitude spectra, including frequency domain intensity and power spectra, are useful for determining and processing the frequency components of a time or spatial domain signal, such as may be produced by Fourier or other complex number transformation of spatial and/or time-based data. Both the Fourier transformation and the magnitude spectrum calculation can cause a heavy computational load on a host microprocessor or digital signal processor (DSP). Fourier transformation is conventionally carried out by special or general purpose electronic computer or optical system in rectangular form, in which time-domain data is transformed to the frequency domain [x(t)]. The Fourier transform is a complex number transform producing an array of complex numbers each defined as Re+iIm, where Re is referred to as the real part of the frequency domain, i is the imaginary number, $i=\sqrt{-1}$, and Im is referred to as the imaginary part of the frequency domain, as follows:

$$X_d(k) = \frac{1}{N}\sum_{n=0}^{N-1} x(n)e^{-i2\pi kn/N}$$

or $$X_d(k) = \frac{1}{N}\sum_{n=0}^{N-1} x(n)\left(\frac{2\pi kn}{N} - i\sin\frac{2\pi kn}{N}\right)$$

Together, these two complex number parts form an array of complex-valued pairs [Re, Im], in which the complex quantities are typically represented as vectors in rectangular (Cartesian) coordinates. The rectangular form may be converted into a polar form also having a function of two parts, magnitude (M) and phase ($\theta$), which can be represented as a rotating vector in polar coordinates. The magnitude component M is transformed from the real and imaginary parts of the rectangular form by calculating the square root of the sum of squares, such that $M=\sqrt{Re^2+Im^2}$. The phase component $\theta$ is similarly transformed as the arctangent of the imaginary part, Im, divided by the real part, Re, such that $\theta=\text{Arctan}(Im/Re)$. Magnitude calculation is also utilized in Euclidean distance determination and vector calculations, and generally in coordinate transformations of rectangular to polar, spherical and cylindrical coordinate systems. In such transformations, phase angle information is an important component of the complete coordinate transform, together with the magnitude or Euclidean distance.

Direct floating/fixed point implementation of the magnitude spectrum calculation is conventionally carried out in appropriately programmed general or special purpose computer systems. In such direct calculations, the real and imaginary parts of each spectral component may be squared and then summed, and finally "square rooted". However, direct calculation of the magnitude spectra is relatively slow, and computationally intense, for applications and systems requiring large data throughputs such as those for speech recognition and image analysis or generation. For example, in a typical general purpose computer chip such as a Pentium II® a squaring operation may take 3 times as long as any arithmetic or logical operation. On a Motorola M*Core™ Risc microprocessor, 2 bits of a multiply are resolved per clock cycle, such that conventional 16 bit precision multiplication would typically be performed over 8 clock cycles, while an arithmetic or logical operation executes in a single clock cycle ("arithmetic" as used herein means primitive register functions add/subtract/increment/decrement or the like and "logical" means primitive logic operations not/or/and/shift_left/shift_right/xor or the like). Numerical squaring operations in general purpose or dedicated computer systems are computationally more time-consuming and require significantly higher hardware capability and capacity than addition operations. Squaring of data can produce relatively large numbers, requiring increased hardware system precision, and will require registers larger than would be needed for primitive addition or subtraction operations. Conventional square root extraction is significantly more computationally intensive for computer apparatus than multiplication (squaring) of numbers. Although a variety of computational methods may be used, square root determination using a conventional computer chip such as Pentium III® or the M*CORE® microprocessors may take 15 times as long as an arithmetic operation. In order to speed up the square root operation, direct computation may be replaced by table operation, in which pre-calculated, tableized, fixed-point data array is used to generate output. In this case a table of square roots is first generated for the anticipated range of the expression ($Re^2+Im^2$). Then the Re, Im number pair is used to address the values in the table, to select a precalculated result for that number pair. However, in order to provide significant accuracy for a range of Re, Im values, the table should be relatively large, which requires significant system memory. A 1024×1024 table to produce 8 bit output precision may typically require about 1 MB of system memory, while 16 bit precision over the same table requires 2 MB memory. However if finer resolution is needed in the table, such as 12 bit by 12 bit lookup which is equivalent to a 4096 by 4096 table, 8 bit output precision requires 16 MB of memory, and 16 bit output precision requires about 32 MB of memory. A power series approximation, such as a Taylor expansion requiring numerous multiplications, may also be used to calculate magnitude spectra, but this is also computationally more time-consuming and hardware-intensive than simple addition and subtraction operations.

Methods and apparatus for effectively carrying out speech recognition and image processing or generation in "real time" typically require processing of large amounts of voice or image data, typically including magnitude transform determination. For example, U.S. Pat. No. 5,960,394 to Gould, et al. (Dragon Systems, Inc.), U.S. Pat. No. 5,749,066 to Nussbaum (Ericsson Messaging Systems Inc.), U.S. Pat. No. 5,890,103 to Carus (Lernout & Haupsie Speech Products N.C.), U.S. Pat. No. 5,640,485 to Ranta (Nokia Mobile Phones, Ltd.), U.S. Pat. No. 4,956,865 to Lennig, et al. (Northern Telecom Limited), U.S. Pat. No. 4,283,601 to Nakijima, et al. (Hitachi, Ltd.), U.S. Pat. No. 5,583,961 to Pawlewski, et al. (British Telecommunications), U.S. Pat. No. 5,465,318 to Sejnoba (Kurzweil Applied Intelligence, Inc.), U.S. Pat. No. 5,054,074 to Bakis (IBM) and the references cited therein (which are incorporated by reference herein), describe a wide variety of known speech recognition and speech processing systems which illustrate the computational intensity of such systems.

Improved computational equipment and methods would be desirable, particularly for low cost and portable systems which efficiently and effectively carry out magnitude transforms for such applications. Accordingly, particularly for portable, low power systems such as cellular telephones, and other hand held or portable devices and appliances which utilize voice and/or image processing, there is a need for efficient new, relatively inexpensive systems for approximating the magnitude of complex numbers.

It is an object of the present invention to provide methods and computational apparatus which can efficiently and effectively approximate magnitude spectra for voice recognition and similar uses.

Separate and alternative objects to provide methods and equipment for rapidly and efficiently approximating phase of complex numerical data, for transforming data from cartesian (rectilinear) coordinate system representation to polar, cylindrical or spherical coordinate systems representation, and/or for determining Euclidean distance between points in two or three dimensional cartesian coordinate space. These and other objects will be apparent from the following specification and the accompanying drawings.

SUMMARY OF THE INVENTION

In accordance with the present invention, magnitude spectra are efficiently determined by piecewise linear approximations of a quadratic function utilized for the approximation. The approximation of magnitude, or Euclidean distance, may also include the approximation of phase of the magnitude vector. Various aspects of the present invention can be implemented in either hardware or software, or both.

One aspect of the present invention is directed to methods for approximating the magnitude M of a number pair [Re, Im], which is defined as $M=\sqrt{Re^2+Im^2}$. The number pair [Re, Im] can also be any Cartesian number pair for which it is desired to approximate the Euclidean distance or vector magnitude. A graphical representation showing the concave complexity of the magnitude M as a function of Re and Im is shown in FIG. 1, which is a perspective view of the function centered at Re=0, Im=0. The rotational symmetry may be used to simplify the approximation process. In order to approximate this magnitude function (or Euclidean distance) in accordance with the present invention, its symmetries are utilized to simplify the approximation, and to reduce its complexity. In this regard, a ratio of the Re and Im values may be selected which is always in the interval from 0 to 1. This can be done by defining a fraction $\beta$ in which the largest absolute value of [Re, Im] is selected as the denominator, and the smallest absolute value of [Re, Im] is selected as the numerator. In this way, the symmetries are used to reduce complexity. In carrying out this step as defined herein, if Re and Im are equal, either may be selected as the maximum value Max, and as the minimum value, Min. When both Re and Im are zero, the magnitude, M, is zero.

A flow chart for an example of a magnitude calculation method is shown in FIG. 2 for processing arrays of Real and Imaginary input values 202. Typically, the Re, Im values will be stored in memory arrays representing a spectrum of values, such as those produced by a Fourier, Mellin, Laplace or other complex transform. The process illustrated in FIG. 2 may be repeated for each of the pairs of values in the arrays, until the magnitude of the entire spectrum of values in the arrays has been approximated. In this regard, as shown in FIG. 2, respective sets of Real number Re 204 and Imaginary numbers Im 206, are processed by absolute value determination to produce the respective absolute values 208, 210. Absolute value determination is relatively simple in binary computer equipment typically involving only dropping any negative number sign.

As shown in FIG. 2, the present disclosure also involves effectively selecting one or more intervals 212 for linear approximation. In this regard, an interval effectively determined by the value of the ratio $\beta$=Min./Max is selected to determine which piecewise linear approximation of M to use. While the ratio $\beta$ can be calculated conventionally, it is advantageous that intervals along $\beta$ may be selected without such direct calculations saving the time and equipment requirements of such calculation. Intervals along the ratio $\beta$ from 0 to 1 can be selected by binary ("power of 2") shifting and comparison.

Also in accordance with the example of FIG. 2, coefficients for a linear approximation over a curve substantially defined by the function $\sqrt{1+\beta^2}$, where $\beta$=Min/Max, or, $\beta$=min[abs(Re, Im)]/max[abs(Re,Im)], are then selected in a range of $\beta$ from 0 to 1, where "Min" and "Max" respectively refer to selection of the minimum and maximum values from the specified list. These coefficients represent different piecewise approximations of the curve over each different interval along $\beta$. The intervals may be equal or unequal in length along $\beta$. Desirably, the intervals will be selected so that they may be readily determined in a binary number system, as will be described more fully in the following Detailed Description of the Invention. FIG. 3A is a graph showing as curve 302, the function $\sqrt{1+\beta^2}$, with the abscissa 304 being the variable $\beta$=Min/Max, and the ordinate 306 accordingly scaled to 1/Max. In FIG. 3A, two linear approximation intervals 308, 310 are selected. The first interval 308 extends from $\beta$=0 to $\beta$=0.5, while the second interval 310 extends from $\beta$=0.5 to $\beta$=1.0. FIG. 3A also includes an error plot showing the relatively high degree of accuracy of the 2-interval approximation. FIG. 3B, discussed subsequently, illustrates a 4-interval linear magnitude approximation, together with an error plot showing a higher accuracy than the 2-interval approximation of FIG. 3A.

A linear approximation of the curve $\sqrt{1+\beta^2}$ is established having a slope as a function of the minimum value, Min, over each respective interval. In this regard, a first linear approximation 312 may be selected which is preferably effectively a "best fit" of the curve 302 along the first interval 308 which is defined by a slope $S_1$ and an ordinate intercept, $K_1$. A second linear approximation 314 may similarly be selected which is effectively a "best fit" of the curve 302 along a second interval 310, where $\beta$ ranges from 0.5 to 1.0. The second linear approximation 314 has a different slope $S_2$, and a different ordinate intercept, $K_2$. Preferably, the linear approximation will be selected to substantially minimize the difference between the actual value of $\sqrt{1+\beta^2}$, and the linear approximation value, over the selected interval, and/or to minimize the calculation time. In this regard, extended precision of a "precise" slope or intercept value may not warrant the increased number of additions/subtractions necessary to produce this accuracy. A "least squares" minimization is a preferred "best fit" approach, but other error minimization approaches may also be used.

Because the ordinate of the curve 302 is expressed in units of 1/Max, and the abscissa $\beta$ is expressed in units of Min/Max, having established the linear approximations in the respective selected intervals, both the ordinate and abscissa may be multiplied by Max to give the magnitude M directly. The specific linear approximation interval of β defined by the Min/Max pair ratio is then selected, and the linear approximation of the curve $\sqrt{1+\beta^2}$ using the selected linear approximation in the selected interval is calculated using the slope S defined predominantly by the value Min and using the intercept K, defined predominantly by the value of Max to obtain an approximation of the magnitude M directly. Having established a linear approximation of the curve $\sqrt{1+\beta^2}$ over a selected interval in β, that linear approximation may be used to directly calculate the magnitude M according to the formula M=S*Min+K*Max (where "*" is an effective multiply symbol). For computational purposes, it may be desirable to separate the ordinate intercept K in two constants, or shift the computational origin, which is mathematically equivalent, but can have practical computational benefits. Accordingly, as shown on FIG. 2, the computational constants 214 are represented by alpha0, alpha 1 and alpha2, with $M=\sqrt{Re^2+Im^2}$. The process can be repeated for each of the number pairs 202, to produce corresponding magnitude approximation outputs 216. Accordingly, as shown in FIG. 2, the appropriate coefficients alpha0, alpha1 and alpha2 for the linear approximation over the selected internal in β may be selected and used to rapidly and efficiently calculate an approximation of the magnitude M of the number pairs, Re, Im. This calculation can be carried out as a conventional multiplication, but has an important advantage that it may also readily and efficiently be carried out by a relative few, simple, one clock cycle binary shifts and addition/subtraction operations (hereinafter "simple arithlogic" operations), as will be described in more detail in the Detailed Description of the Invention.

The present invention is also generally directed to methods and apparatus for efficiently approximating the phase angle θ, or the Arctangent, of a number pair ratio, such as Im/Re. Like the calculation of the square root of the sum of squared numbers, the Arctangent of a number ratio is a nonlinear function which can vary widely (from zero to plus or minus infinity) over broad ranges of the ratio, and its exact calculation is time-consuming and equipment-intensive. A graphical illustration of the value θ=Arctan Im/Re centered at Re=0, Im=0, is shown in FIG. 6 where θ is in radians, which illustrates in part the complexity of the function. However, by transformation of variables, and careful use of symmetry, rapid and efficient approximation can be carried out using linear approximation methods similar to those previously described for efficient magnitude approximations. In this regard, the trigonometric calculation of the Arctangent function can be simplified by transformation of variables to ratios β of [Re, Im] which are in the range of 0 to 1 by selecting the largest absolute value Max of the number pair, [Re, Im], as the denominator, and the smallest absolute value Min of the number pair Re, Im as the numerator of the fraction β for the arctangent calculation, where β=min[abs(Re, Im)]/max[abs(Re,Im)], or β=Min/Max. This limits the arctangent phase calculation to the 0–45° zone of the Arctangent function, as shown in FIG. 7, where β is necessarily in the range 0 to 1, as previously discussed. For the zone 45°–90°, the trigonometric relationship Arctangent (Min/Max)=Arccotangent (Max/Min)=90°−Arctangent (Min/Max) may be utilized. Thus, by tracking the sign (+ or −) and relative size of the Re and Im variables, the full 360° range of Arctangent (Im, Re) may be rapidly and efficiently approximated.

To approximate the phase θ, one or more linear approximation intervals may be selected over a curve substantially defined by the function Arctangent β, where β=Min/Max, or, β=min[abs(Re, Im)]/max[abs(Re,Im)], in a range of β from 0 to 1. The intervals may be equal or unequal in length, as previously described. Desirably, the intervals will be selected so that they may be readily determined in a binary number system, as will be disclosed in more detail in the following Detailed Description of the Invention. In this regard, FIG. 8A is a graph showing as curve 802, the function Arctangent (β) with the abscissa 804 being the variable β=Min/Max, and the ordinate 806 scaled to either degrees, or radians, as may be desired over the range 0–45°, or 0–π/4 radians. In the example of FIG. 8A, two linear approximation intervals 808, 810 are selected. The first interval 808 extends from β=0 to β=0.5, while the second interval 810 extends from β=0.5 to β=1.0. A linear approximation having a slope as a function of the minimum value, Min, of the curve Arctangent β is established over each respective interval 808, 810. In this regard, a first linear approximation 812 may preferably be selected which is an effective "best fit" of the curve 802 along the first interval 808 where β ranges from 0 to 0.5. The first linear approximation interval is defined by a slope $S_1$ and an ordinate intercept $K_1$. A second linear approximation 814 is selected which is effectively a "best fit" of the curve 802 along the second interval 810 where β ranges from 0.5 to 1.0. The second linear approximation has a different slope $S_2$, and a different ordinate intercept $K_2$, as shown in FIG. 8A. Preferably, the linear approximations will be selected to substantially minimize the difference between the actual value of Arctangent β, and the linear approximation value, over the selected interval, and/or to minimize the calculation time. Again, a substantially least-squares best fit may be made over the interval, but other best-fit approximations may also be used.

As discussed previously, the ordinate of the curve 802 is expressed in units of degrees or radians, and the abscissa β is expressed in units of β=Min/Max. Having established the linear approximation in the selected intervals, both the ordinate and the abscissa may be multiplied by Max to simplify the slope and intercept calculation. The specific linear approximation interval of β defined by the Min/Max pair is selected, and the selected linear approximation 812 or 814 is calculated to obtain an approximation of the phase θ, according to the formula Max*θ=S*Min+K*Max, where S is a slope and K is an ordinate intercept constant. This calculation can be readily and efficiently carried out by simple binary shifts and addition/subtraction operations. In order to obtain the phase angle θ value, the function Max×θ may be "divided" by Max (the largest value of the Re, Im pair). Because divide operations are time intensive, such division may be more effectively carried out in binary form by multiplying by the binary inverse, 1/Max, in accordance with reciprocal multiplication practice. The value θ*Max/Max may accordingly be calculated by determining the reciprocal $2^R$/Max where R is the position of the binary decimal point (radix point), multiplying (θ*Max) by the reciprocal 1/Max, and, shifting right R binary positions. Partial binary inverse multiplication may be used to select intervals over the range β, as previously discussed. Fixed integer multiplication may be carried out with a combination of conventional, simple, fast instructions such as SHL, ADD, SUB and LEA. This division approximation method may introduce rounding errors (which can be minimized or eliminated in accordance with conventional practice).

A four-interval linear approximation of the Arctangent phase function is shown in FIG. 8B, normalized to β[0.00–1.0]. The intervals are 0–0.25, 0.25–0.5, 0.5–0.75, and 0.75–1.0, and the respective linear approximations so closely approximate the arctan function 860 that the difference 862 are difficult to represent in the FIGURE, as confirmed by the actual plot of difference shown in registration therewith below the arctan curve.

This invention accordingly allows for efficient calculation of magnitude (power) spectra by eliminating the need for conventional square root operation, and extensive conventional multiplies (which typically involve extended precision) used during the conventional implementation of a magnitude spectrum or coordinate transform calculation. In preferred embodiments of magnitude approximation, the removal of explicit multiplication also has a number of important advantages. Improved computational efficiency can be provided on some processors while the second is the lack of need for extended precision. A multiply of N bits by N bits generates a result of 2N bits which must be temporarily stored in a register, whereas preferred embodiments of the present invention generally do not need more than N+1 bits of precision at any stage of calculation. The present methods can be implemented in hardware or software, as indicated, and in either fixed or floating-point numeric formats.

In accordance with the present invention, power spectra can be rapidly and efficiently calculated for uses in portable speech recognition systems, and other uses which may particularly benefit from small, portable or low power equipment.

Various aspects of the invention are described in more detail in the following Drawings and Detailed Description of the Invention.

DESCRIPTION OF THE DRAWINGS

FIG. 3A is a graphical representation of a two-segment, linear least-squares approximation example of a magnitude spectrum approximation method like that of FIG. 2, together with a graphical representation of the calculation error between the actual magnitude and the piecewise linear approximation, in registration therewith;

FIG. 3B is a graphical representation of a four-segment, linear least-squares approximation example of a magnitude spectrum approximation method like that of FIG. 2, together with a graphical representation of the calculation error between the actual magnitude and the piecewise linear approximation, in registration therewith;

FIG. 4 is a schematic flowchart of an example of a speech recognition system utilizing a rapid and efficient magnitude spectrum approximation in accordance with the present invention;

FIG. 8A is a graphical representation of an example of a two-segment, linear least-squares approximation of the phase angle θ of a Cartesian number pair Re, Im, in accordance with the present invention, together with a graphical representation of the calculation error between the actual arctangent function and the piecewise linear approximation in registration therewith;

FIG. 8B is a graphical representation of an example of a four-segment, linear least-squares approximation of the phase angle θ of a Cartesian number pair Re, Im, in accordance with the present invention, together with a graphical representation of the calculation error between the actual arctangent function and the piecewise linear approximation in registration therewith; and

DETAILED DESCRIPTION OF THE INVENTION

In accordance with the present invention, magnitude spectra may be efficiently determined by piecewise linear approximations of a quadratic function utilized for the approximation. The approximation of magnitude, or Euclidean distance, may also be accompanied by the approximation of phase of the magnitude vector. Various aspects of the present invention can be implemented in either hardware or software, or both. In this regard, the present disclosure is directed to a method for approximating the magnitude M of a number pair Re, Im, which comprise the step of selecting the largest absolute number, Max, of the Re, Im pair. In the imaginary value of Re can typically be the real value, and a complex number pair. However, Re, Im can also be any Cartesian number pair for which it is desired to approximate the Euclidean distance.

In carrying out this step as described herein, if Re and Im are equal, either may be selected as the maximum value Max, and as the minimum value, Min, and either may be regarded as the minimum or maximum value in the method. The method also involves the step of selecting one or more intervals over a curve substantially defined as $\sqrt{1+\beta^2}$, where $\beta=\min[\text{abs}(Re, Im)]/\max[\text{abs}(Re,Im)]$ in a range of β from 0 to 1. The interval may be equal or unequal in length. Desirably, the intervals will be selected so that they may be readily represented and manipulated in a binary number system.

The method also includes the step of establishing a linear approximation as a function of the minimum value Min of the curve $\sqrt{1+\beta^2}$ over each respective interval. The interval of β defined by the Min/Max pair is then selected, and the linear approximation of the curve $\sqrt{1+\beta^2}$ using the selected linear approximation in the selected interval is calculated to obtain an approximation of the magnitude M, as previously discussed.

Figure 6:
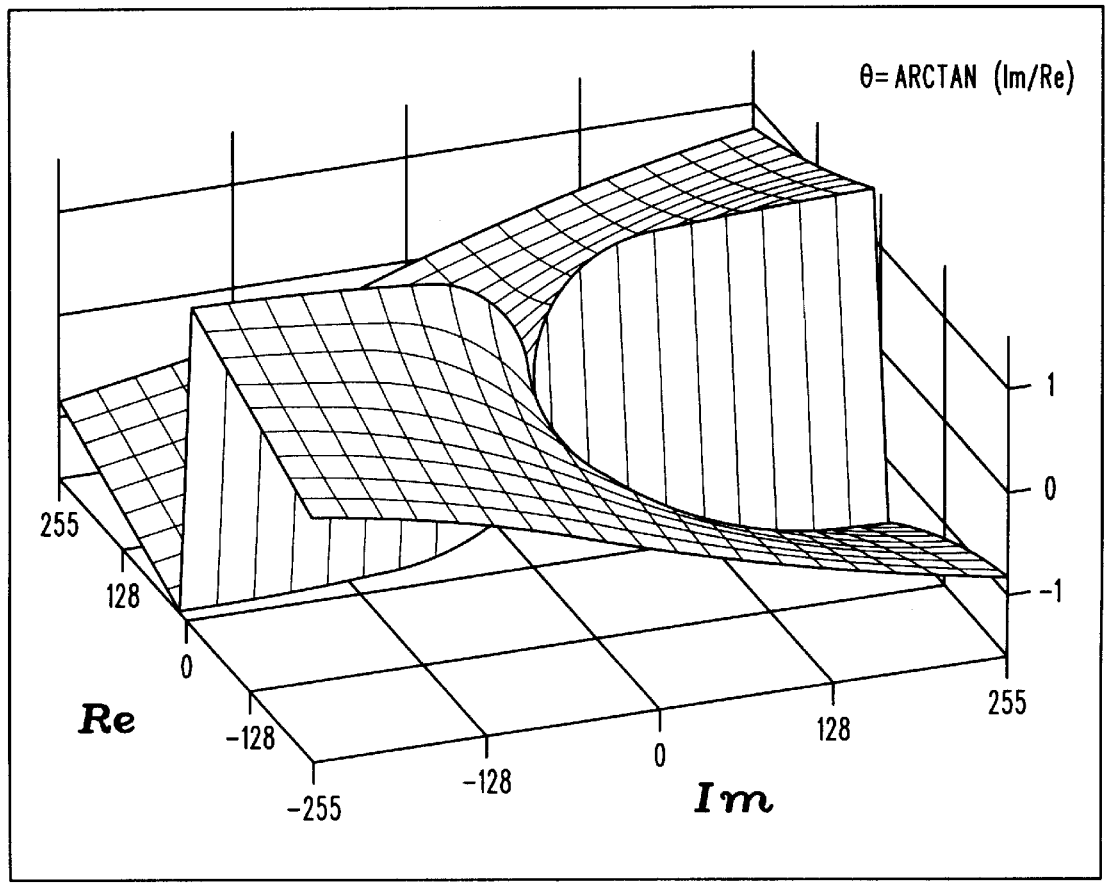
FIG. 6 is a perspective graphical contour plot of the phase angle θ of Cartesian number pairs plotted as Arctangent (Im/Re) centered at Re=0, Im=0.
Figure 7:
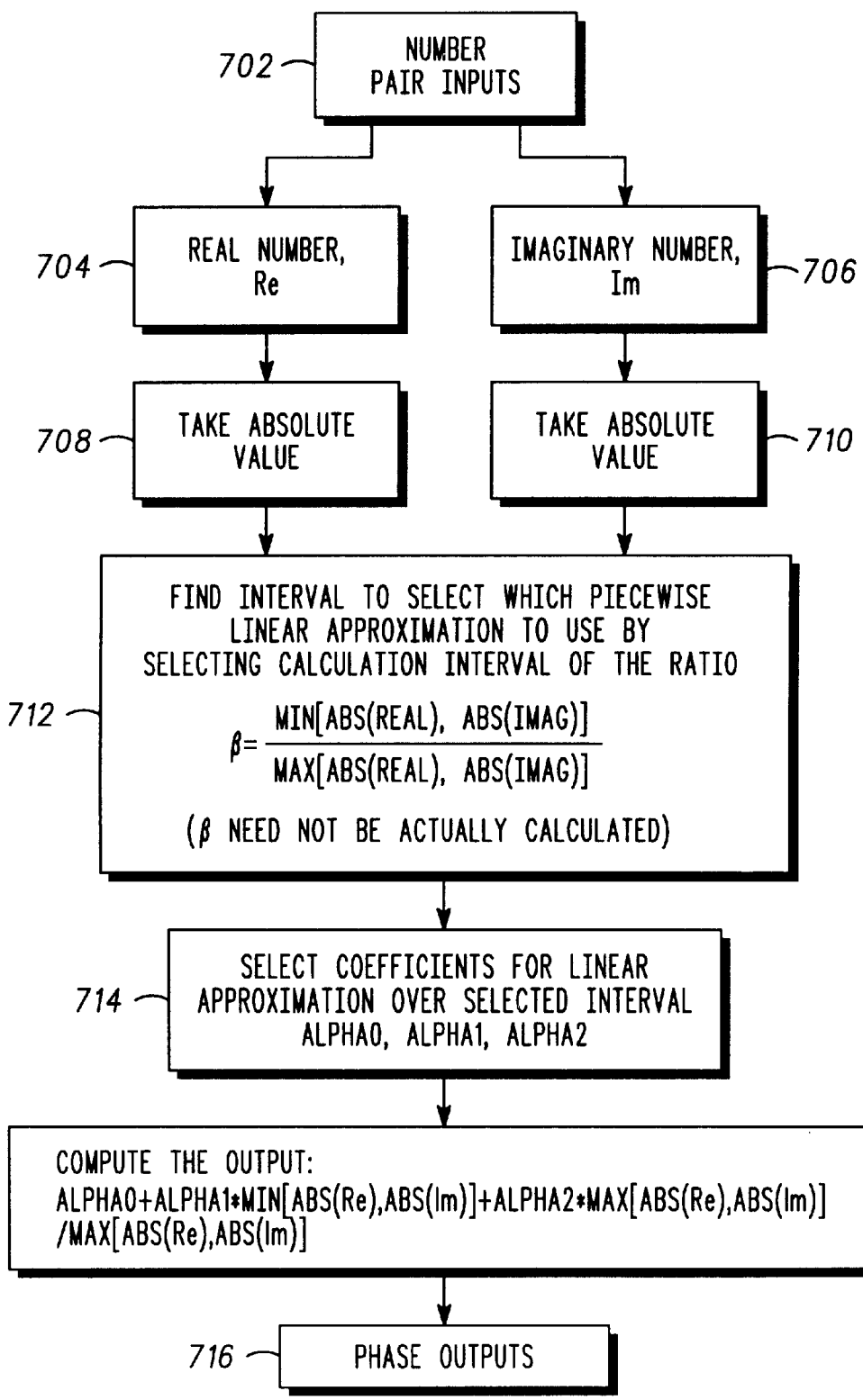
FIG. 7 is a schematic flowchart of a phase approximation method in accordance with the present invention.

As indicated, the present invention is also generally directed to methods and apparatus for approximating the phase angle θ, or the arctangent, of a number pair ratio, such as Re/Im. Like the calculation of the square root of the sum of squared numbers, the arctangent of a number ratio is a nonlinear function which can vary widely (from zero to + and − infinity) over broad ranges of the ratio, and its exact calculation is time-consuming and equipment-intensive. However, by transformation of variables, and careful use of symmetry, rapid and efficient approximation of the Arctan function of the ratio can be carried out using linear approximation methods similar to those previously described for magnitude calculations. In this regard, the trigonometric calculation of the Arctan function can be simplified by transformation of variables to select ratios of Re, Im which are in the range of 0 to 1, by selecting the largest absolute value Max of the number pair, Re, Im, as the denominator, and the smallest absolute value Min of the number pair Re, Im as the numerator of the fraction β for the arctangent calculation, where β=min[abs(Re, Im)]/max [abs(Re,Im)]. This limits the arctangent phase calculation to the 0–45° zone (0 to π/2) of the arctangent function, as shown in FIG. 6. For the zone 45°–90°, the trigonometric relationship arctan (Min/Max)=arccotan (Max/Min)=90°-arctan (Min/Max) may be utilized. By tracking the sign (+ or −) and relative magnitude of the Re and Im variables, the full 360° range of Arctangent (Im/Re) may be rapidly and efficiently approximated.

This invention accordingly also allows for efficient calculation of phase angle and magnitude vector (power) spectra by eliminating the need for conventional Arctangent calculation used during the conventional implementation of a magnitude vector or coordinate transform calculation. Addition/subtraction operations and only one "divide" operation is utilized, which represents considerable computational advantage over more complex methods.

For conventional Arctangent calculations of the ratio of Im/Re, the ratio may be positive, negative, zero or approach infinity (undefined for a denominator of zero) and the arctan function is decidedly nonlinear and difficult to calculate. However, by transformation of variables, the Arctangent calculation can similarly be represented as a function of a single variable, by approximating the Arctangent of the new variable, β, which is defined as θ=min[abs(Re, Im)]/max [abs(Re,Im)], as previously described. Thus, the absolute values of both Re and Im are determined, and the smallest (or equal number) becomes the numerator, and the largest becomes the denominator. For all real number pairs (Re,Im), β is accordingly in the interval [0,1].

The magnitude spectrum (which may also be referred to as a Magnitude of Power Spectrum) may be calculated by taking the real, Re, and imaginary, Im, parts (normally presented as two corresponding arrays of numbers) of a Complex Fourier Transform in rectangular form. For each pair of numbers the magnitude of power ("M") is defined as M=Sqrt (Re$^2$+Im$^2$), which is the Euclidean distance in polar form. In order to obtain the magnitude spectrum, this calculation is repeated for all the number pairs in the transform. In a generalized number pair Re, Im, either variable may be zero, positive or negative, and may have a numerical value extending over the full, permitted range of the variable. Thus, the absolute value of Re may be greater, smaller, or the same as the absolute numerical value of Im.

When β is zero, the true expression for the magnitude M is M=max[abs(Re,Im)]. When β is 1, the absolute value of the Re and Im parts are equal, so that abs(Re)=abs(Im). Accordingly, M=sqrt(2)*abs(Re), or sqrt(2)*abs(Im). In accordance with the present invention, linear approximations may be made for the equation which defines M in the interval β[0,1]. In this interval M=Max(Re, Im)*(1+β$^2$). In practice it is not necessary to calculate β explicitly. Instead, an interval in [0,1] in which the two values for Re, Im lie in may be determined by comparing abs(Re) with abs(Im), and selecting the interval by using simple binary powers of 2 shift operations. The following software code makes use of a 2 piece approximation in which this comparison logic is demonstrated. Using a straight line to approximate the entire interval β [0,1], the magnitude M can be approximated by a straight line, such as defined by M~=max[abs(Re, Im)]+ 0.25*min[abs(Re, Im)] to a peak error of about 0.164 and a root means square (rms) error of about 0.045. By using a least squared fit of a single interval linear approximation over the entire interval 0–1, the error of the single line fit approximation may be improved to about 0.0625 peak and 0.0249 root mean square (rms), the accuracy of the linear approximation may be improved. In this regard, this accuracy is achieved by selecting only a single line which minimizes the total squared error over the entire interval, defined by a formula such as M=*max[abs(Re, Im)]+K* min[abs(Re, Im)]. More importantly, however, by providing 2 or more (e.g., 2 to 16, more preferably 2 to 8) linear approximation zones along the interval of β [0,1], such as [0 to 0.5] and 0.5 to 1.0, different line fits can be provided for each part of the interval, very substantially increasing the accuracy of a rapid magnitude determination based on linear approximation.

The use of coefficients that are easily represented in binary form represents a design trade off for speed versus accuracy. That is, the accuracy of the binary representation of the slope S and the intercept K values may be balanced against the increased processing necessary to perform multiple binary shifts and additions for increased accuracy. The following software code illustrates a reasonably accurate, 2 interval approximation using numbers that are "friendly" to power of 2 arithmetic. This use of "friendly" numbers keeps speed while limiting the number of shift (<<,>>) operations used. Note that the accuracy of this approximation increases with the number of intervals used. However, an increased number of intervals may result in a correspondingly increased number of shift operations, which could decrease the overall efficiency of the method. This function is convergent on the "true" magnitude value, with increasing numbers of linear approximation intervals along the $\sqrt{1+\beta^2}$ curve.

The magnitude spectrum determination method of the present invention has particular utility for speech processing and/or recognition in front-end processors and methods for speech feature vector extraction. Having generally described various aspects of the present invention, its utilization generally in accordance with the evolving Aurora speech processing standard, which addresses computation of feature vectors from speech waveforms sampled at a variety of different rates (e.g., 8, 11, and 16 kHz).

There is general agreement that certain feature extraction "front-ends" of a wide variety of speech recognition systems are similar, permitting a common design applications and standard or so called "speech recognition codec" for both distributed speech recognition systems and monolithic speech recognition products.

The Aurora Project is a joint multi-company initiative set up to establish such a global standard for distributed speech recognition ("DSR") under the guidance of the European Commission and ETSI. The extracted speech feature vectors of the Aurora standard and other speech recognition systems may comprise a number (e.g., 13) of static cepstral components and a log-energy component, which require determination of the magnitude spectrum of the speech being processed. The feature vectors may also be compressed in a variety of ways, if desired. The Aurora standard has evolved overtime, and the various versions show relatively straight forward ways of defining a Mel-Cepstrum based speech recognition system front end.

Illustrated in FIG. 4 is a block diagram of the processing steps and calculation systems of a mel-cepstral recognition system 400 which generally meets the Aurora Standard, while also utilizing a rapid and efficient magnitude approximation in accordance with the present invention.

As shown in FIG. 4, the analog input speech is digitized by an analog-to-digital converter 402 in accordance with conventional practice. Different digitization accuracies (e.g., 8 bits, 12 bits, 16 bits, etc.) can be used depending on the performance properties desired. The output sampling rates of the ADC block may be $f_{s1}$=8 kHz, $f_{s2}$=11 kHz, and $f_{s3}$=16 kHz, and may have a resolution accuracy of typically 6–16 bits.

The digital speech signal 404 produced by the ADC 402 is divided into overlapping frames of N samples by framing sampler 406. The frame shift interval (difference between the starting points of consecutive frames) is M samples. The parameter M defines the number of frames per unit time. The specific values of N and M may depend on the sampling rate according to the following table. The frame length may, for example, be 25 ms for 8 and 16 kHz sampling, and 23.27 ms for 11 kHz sampling speeds by the ADC 402.

| Sampling rate (kHz) | $f_{s3}$ = 16 | $f_{s2}$ = 11 | $f_{s1}$ = 8 |
| --- | --- | --- | --- |
| Frame length N (samples) | 400 | 256 | 200 |
| Shift interval M (samples) | 160 | 110 | 80 |

The framed, digitized sample stream 407 produced by framing sampler 406 is filtered by high pass filter 409. The purpose of the high pass filter 408 is to remove the DC component from the input signal. Mean subtraction may be applied for each frame independently, as follows:

$$s_{out}(n) = s_{in}(n) - \frac{1}{N}\sum_{i=1}^{N} s_{in}(i), \quad 1 \leq n \leq N.$$

where N is the frame length and $s_{in}$ and $s_{out}$ are the input 407 and output 410 of the high pass filter 408, respectively. The high pass filter 408 may be a conventional hardware filter or a software-configured general processor. The high-pass filtered output 410 of the high pass filter 408 may be a conventional digital hardware filter, or a software-configured general processor. The purpose of this filter is to reduce or remove DC offset and low frequency components which may linger in the signal and are generally not a major part of the speech information. Most speech information (even in tonal languages such as Mandarin Chinese) is present in the harmonics which reside from about 800 Hertz to 3000 Hertz. By applying a high pass filter, the fundamental frequency (where the most spectrum power resides) is deemphasized. If tonal information is required, then a separate algorithm or processing system may be used to operate on the data to extract this information.

The output 410 of the high-pass filter 408 may also be processed by a pre-emphasis processor, also to reduce or remove DC offset and low frequency components below about 700–800 Hertz. The pre-emphasis may be carried out using an appropriate filter 412 as follows:

$$s_{out}(n) = s_{in}(n) - 0.97 \cdot s_{in}(n-1).$$

where $s_{in}$ and $s_{out}$ are the input signal 410 and the output signal 414 of the Pre-emphasis filter, respectively.

The logarithmic frame energy is computed from the pre-emphasis output signal 414 after the high-pass filter (HPF) and pre-emphasis (PE).

$$\log E = \ln\left(\sum_{i=1}^{N} s_i^2\right).$$

Where S is the digitized preemphasis-filtered signal 414. While only one may be used, if desired, both the high pass filter 408 and preemphasis filters 412 may work together to accomplish the enhancement of the primary speech information harmonics. In the illustrated embodiment, N is the frame length and s is the output signal 414 of the pre-emphasis processor 412. In accordance with the Aurora proposed standard, a floor may be used in the energy calculation to ensure that the result is not less than a predetermined, selected minimum value, such as −50. The floor value (lower limit for the argument of ln) may, for example, be approximately 2e-22.

A Hamming window of length N may also be applied to the output of the pre-emphasis block by a Hamming window processor 418 in accordance with the Aurora system definition:

$$s_{out}(n) = \left\{0.54 - 0.46 \cdot \cos\left(\frac{2\pi(n-1)}{N-1}\right)\right\} \cdot s_{in}(n), \quad 1 \leq n \leq N$$

where N is the frame length and $s_{in}$ and $s_{out}$ are the input and output of the windowing block, respectively.

The digitized, Hamming windowed, output signal samples 420 are transformed into frequency space by Fast Fourier transform processor 422. Each frame of N samples may be zero padded to form an extended frame of 256 samples for 8 and 11 kHz sampling and 512 samples for sound signals which are digitized at 16 kHz. The FFT processor 422 applies a fast Fourier transform of length 256 or 512, respectively, to compute the frequency transform of the data 420, $$bin_k = \left|\sum_{n=0}^{FFTL-1} s(n)e^{-jnk\frac{2\pi}{FFTL}}\right|, \quad k = 0, \ldots, FFTL-1.$$

where s(n) is the input signal 420 to the FFT processor 422, FFTL is the block length (256 or 512 samples), and $bin_k$ is the absolute value of the resulting complex vector. The number of output values is reduced because of symmetry.

It is necessary to compute the magnitude spectrum of the frequency-transformed signal, which is time consuming when using conventional systems, as previously discussed. In accordance with the present invention, the rectangular (Cartesian) coordinate FFT signal samples 424 produced by FFT processor 422 are processed by a linear interval magnitude approximator 426 to provide magnitude spectrum signal samples 428. The magnitude spectrum approximator 426 and the linear segment approximation processing step it carries out is an important feature of the illustrated speech recognition system.

In accordance with the present invention, the magnitude approximation may be carried out by general purpose computer systems, and/or by specialized digital signal processors (DSPs), (ASICs) or other specialized digital (or analog) logic systems. As an example of a programmed general purpose computer system implementation, the following programs may use a programmed general purpose computer system, such as that based on a Motorola M*CORE® microprocessor based system. In this regard, the following MATLAB program "GenerateEuclidApprox.m", generates C code output without structures hereinafter named "euclid.c") for the linear approximation of magnitude spectra. The MATLAB program "ChangeBase" changes fixed point decimal numbers to other bases, here base 2, and is a pre-requisite for the MATLAB program "GenerateEuclidApprox":

GENERATEEUCLIDEAPPROX.M

```
% GenerateEuclidApprox.m
% M A Chatterjee
% This program automatically generates the C language equivalent
% for the euclidean distance approximation used in Magnitude Spectrum
% Estimation
function GenerateEuclidApprox(filename,num_intervals,prec)
if (nargin < 3)
fprintf('GenerateEuclidApprox(filename,number of_intervals,prec)\n');
    return;
end
if (fix(log2(num_intervals)) ~= log2 (num_intervals))
    fprintf('num_intervals must be a power of 2');
    return;
end;
if (nargin < 3)
    prec = 10;
end
x = 0:1\num_intervals:1;
d_euclid = (sqrt(1+x.*x));
coef = zeros (num_intervals,2);
for i = 1: num_intervals
    tx = x(i) :i/(2^prec):x(i+1);
    ty = (sqrt(i+tx.*tx));
    coef(i, :) = polyfit(tx,ty,1); % this computes the coefficients for
each segment of the approx
end
clear tx;
clear ty;
dx = 're'; % use this replace the names of the two variables
dy = 'im'; % to say (re,im) etc.
fp = fopen(filename, 'wt');
if (fp)
    fprintf(fp,'/* Automatically Generated Euclid Approx file \n');
    fprintf(fp, ' * by GenerateEuclidApprox.m MATLAB script by M A
Chatterjee\n');
    fprintf(fp, ' * number of intervals used = %d\n',num_intervals);
    fprintf(fp, ' * EuclidApprox(x0, y0, x1, y1) ~= sqrt( (x1-x0)^2 +
(y1-y0)^2) ;\n');
    fprintf (fp, ' */\n');
    fprintf(fp, ' *\n\n');
    fprintf(fp, ' #define LOCAL_ABS(x) ((x)<0?(-x)(x))\n\n');
    fprintf(fp,'long EuclidApprox (long x0, long y0, long x1, long
y1)\n');
    fprintf(fp, ' {\n');
    fprintf(fp, ' long %s;\n',dx);
    fprintf(fp, ' long %s;\n',dy);
    fprintf(fp, ' %s = LOCAL_ABS(x1-x0);\n',dx);
    fprintf(fp, ' %s = LOCAL_ABS(y1-y0);\n',dy);
    fprintf(fp, ' if(%s > %s)\n',dx,dy);
    fprintf(fp, ' {\n');
    for j = 1:num_intervals
        fprintf(fp,'      dist = %s+%s;\n',fract_mult_c
(coef(j,2),prec,dx),fract_mult_c (coef(j,1),prec,dy));
    end
    fprintf(fp, ' }\n');
    fprintf(fp, ' else\n');
    fprintf(fp, ' {\n');
    for j = i:num_intervals
        fprintf(fp,'      dist = %s+%s;\n',fract_mult_c
(coef(j,2),prec,dy),fract_mult_c (coef(j,1),prec,dx));
    end
    fprintf(fp, ' }\n');
    fprintf(fp, ' \n');
    fprintf(fp, ' \n');
    fprintf(fp, ' return dist;\n');
    fprintf (fp,' }\n');
    fclose(fp);
end
% =========================================
% this function represents a fractional multiply
% as a distributed shift-subtraction
function str = fract_mult_c (num,prec,numstr)
binnum = ChangeBase(num,prec,2);
if (num >= 1)
else
    binnum = [0 binnum];
    str = '';
```

GENERATEEUCLIDEAPPROX.M — continued

```
    j = 1;
    while j < length(binnum)
        if (binnum(j) )
            if (~isempty(str))
                str = sprintf('%s+(%s>>%d)',str,numstr,j-1);
            else
                str = sprintf('(%s>>%d)',numstr,j-1);
            end
            j = j + 1;
        else % binnum(j) == 0
            numz = 0;
            for k = j+1:length(binnum);
                if (binnum(k) == 0)
                    k = k -1;
                    break;
                else
                    numz = numz+1;
                end
            end
            if (numz > 2)
                if (~isempty(str))
                    str = sprintf('%s+(%s>>%d)-(%s>>%d) ',str,numstr,
j-1,numstr,k-1);
                else
                    str = sprintf('(%s>>%d)-(%s>>%d) ',numstr,
j-1,numstr,k-1);
                end
                j = k+1;
            else
                j = j + 1;
            end
        end % if binnum(j)
    end
end
```

The following "C" code, "euclid.c", is a generated output from the MATLAB script.

```
/* Automatically Generated Euclid Approx file
 * by GenerateEuclidApprox.m MATLAB script by M A Chatterjee
 * number of intervals used = 4 (or may be 2, 8 or 16)
 * EuclidApprox(x0, y0, x1, y1) ~= sqrt( (x1-x0)^2 + (y1-y0)^2);
 */
#define LOCAL_ABS(x) ((x)<0?(-x):(x))
long EuclidApprox (long x0, long y0, long x1, long y1)
{
        long re;
        long im;
        re = LOCAL_ABS(x1-x0);
        im = LOCAL_ABS(y1-y0);
    if(re > im)
    {
                if ((re>>1) < im)
                {
                        if ((re>>2) < im)
                        {
                                dist = (re>>0)-(re>>7)+(re>>9)+(im>>3)-(im>>9);
                        }
                        else
                        {
                                dist = (re>>0)-(re>>4)+(im>>2)+(im>>4)+(im>>5)+(im>>8)+(im>>9);
                        }
                }
                else
                {
                        if ((re>>1)+(re>>2) < im)
                        {
                                dist = (re>>1)+(re>>2)+(re>>4)+(re>>5)+(re>>7)-(re>>10)+(im>>1)+(im>>5)-(im>>8) ;
                        }
```

```
            else
            {
                dist =
(re>>1)+(re>>2)+(re>>8)+(im>>1)+(im>>3)+(im>>5);
            }
        }
    }
    else
    {
        if ((im>>1) < re)
        {
            if ((im>>2) < re)
            {
                dist = (im>>0)-(im>>7)+(im>>9)+
(re>>3)-(re>>9);
            }
            else
            {
                dist = (im>>0)-
(im>>4)+(re>>2)+(re>>4)+(re>>5)+(re>>8)+(re>>9);
            }
        }
        else
        {
            if ((im>>1)+(im>>2) < re)
            {
                dist =
(im>>1)+(im>>2)+(im>>4)+(im>>5)+(im>>7)-(im>>10)+(re>>1)+
(re>>5)-(re>>8) ;
            }
            else
            {
                dist =
(im>>1)+(im>>2)+(im>>8)+(re>>1)+(re>>3)+(re>>5);
            }
        }
    }
    return dist;
}
```

```
                        ChangeBase.m

% this function takes a number and converts it to a different base b
with precision p
% NewBase = ChangeBase(x,p,b)
%
% Precision is defined as number of bits AFTER the radix point so
% 8.1875 = 8 3⁄16 =
% 1 0 0 0 0 0 1 1 0 0 0 0
%                  *
% in binary where the * represents the radix point
function [NewBaseNunber] = ChangeBase(StartNum,prec,base);
if (nargin < 3)
    base = 2;
end
if (nargin < 2)
    prec = 16;
end
k = 1;
Q = StartNum;
StartNum = StartNum + base^(-(prec+1));
Q = fix(StartNum);
NewBaseNumber = [];
j = 0;
while (Q > 0)
    NewBaseNumber(k) = mod(Q,base) ;
    Q = fix(Q/base) ;
    k = k + 1 ;
end
NewBaseNumber = fliplr (NewBaseNumber);
Q = (StartNum-fix(StartNum))*base;
while (j < prec)
    NewBaseNumber(k) = fix(Q);
    Q = Q - fix(Q);
```

```
                        ChangeBase.m

Q = Q * base;
    j = j + 1;
    k = k + 1;
end
```

Figure 1:
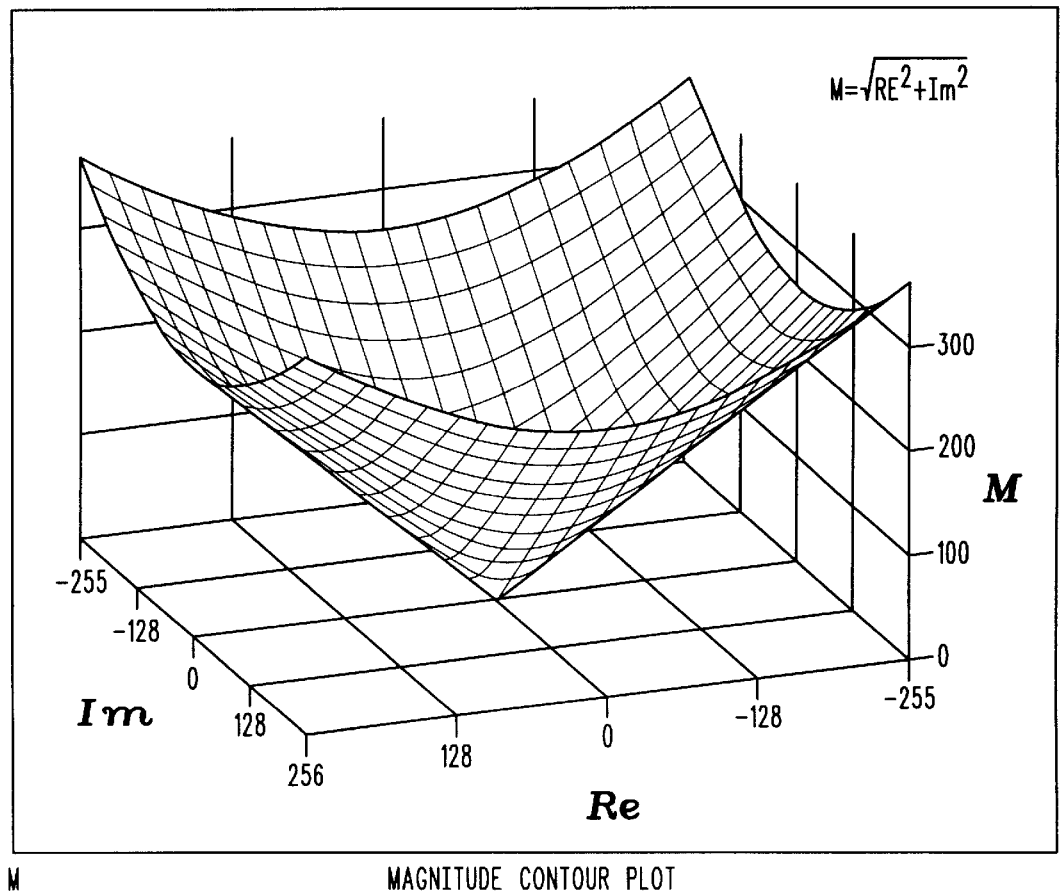
FIG. 1 is a perspective graphical contour plot of the magnitude M of Cartesian number pairs Re, Im, centered at Re=0, Im=0.
Figure 2:
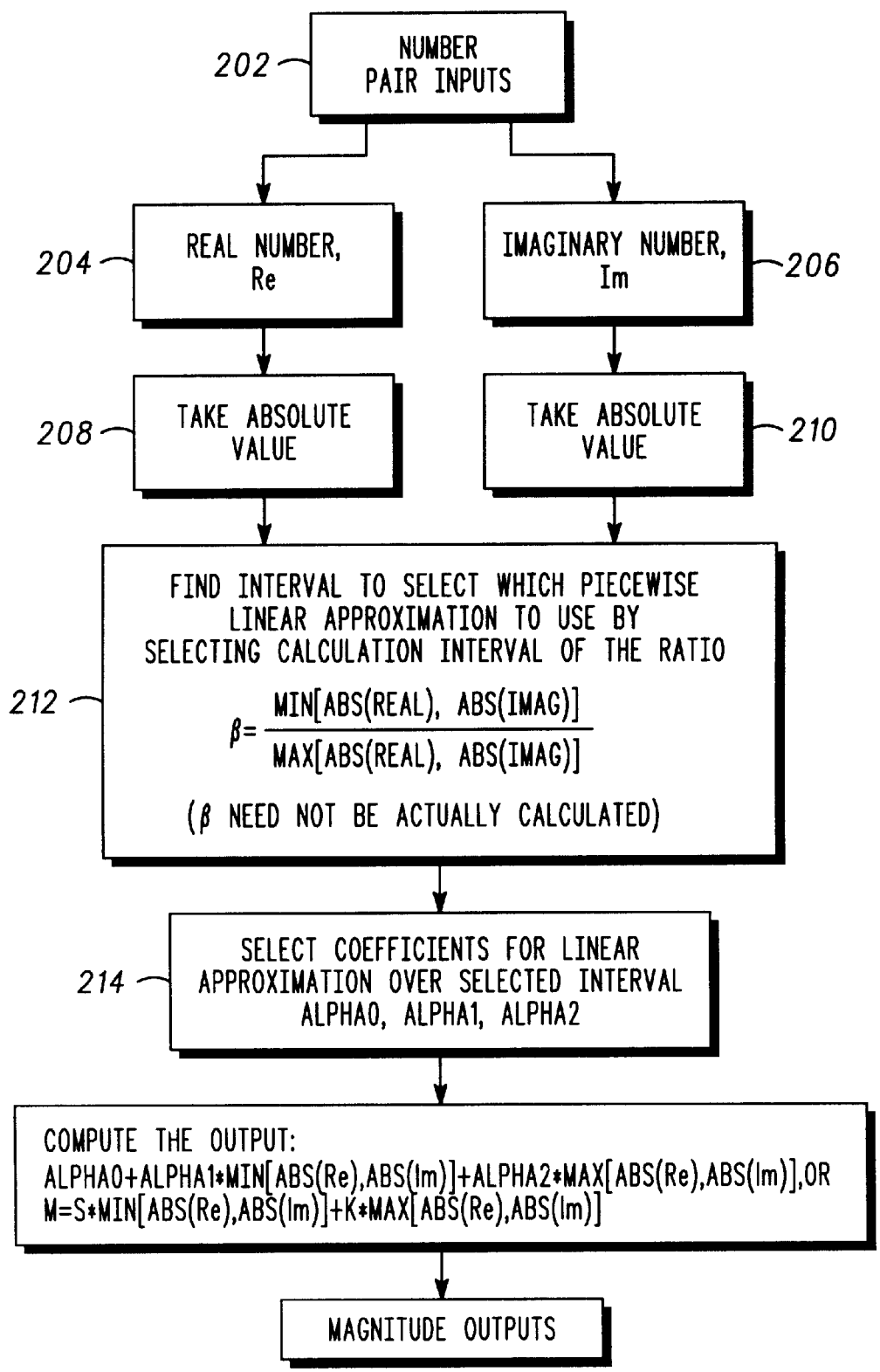
FIG. 2 is a schematic flowchart of an embodiment of a rapid and efficient Fourier Magnitude spectrum approximation method in accordance with the present invention.

The illustrated magnitude processor 426 such as programmed as described, carries out the process illustrated in FIGS. 2 and 3. In this regard, the digital output samples 424 of the FFT processor 422 are arrays of Real and Imaginary numbers, generally each of the sample size of the digital input signal 420. Thus, for a 512 ample digital signal vector input 420 to the FFT processor 422, the output 424 will be a 512 sample Real vector, and a 512 sample Imaginary vector of corresponding Re, Im vector pairs 202, 204 (FIG. 2) which form the input to magnitude processor 426. The illustrated magnitude processor 426 utilizes two-interval linear approximation of the curve $\sqrt{1+\beta^2}$, over the interval $\beta=0$ to 1, where $\beta=\text{Min}[\text{abs}(\text{Re},\text{Im})]/\max[\text{abas}(\text{Re},\text{Im})]$ as previously described. The first interval 308 along $\beta$ is from 0 to 0.5 (FIG. 3). The second contiguous interval 310 along $\beta$ is from 0.5 to 1.

In the first interval 308, a best fit linear approximation 312 is used having a slope $S_1$ of 0.9807 and an ordinate intercept $K_1$ of 0.2382. In the second interval 310, a best fit linear approximation 314 is utilized having a slope $S_2$ of 0.8091 and an ordinate intercept $K_2$ of 0.5951. The peak error for the 2 piece approximation using these 2 piecewise linear approximations is 0.0156250 and root mean square error over the entire range is 0.0075584. Using finer intervals, the mean error diminishes. However, the number of shifts and adds increases quickly to the point that runtime efficiency is sacrificed. If higher resolution is desired, a power series addendum to the algorithm may be utilized, but the computational speed benefit diminishes.

As previously indicated, it is a benefit of the present invention that the linear approximations may be carried out by shifting and add/subtract operations, without a "true" time-consuming multiplication step. In this regard, a binary representation for the slope $S_1$ and ordinate intercept $K_1$ in the first segment 308 of the two-interval example of FIG. 3A may be provided by adding and/or subtracting binary shifted versions of the desired multiplicand. For example, as previously indicated, the magnitude M in a selected interval of $\beta$ is approximated by the linear relationship M=S*Min+ K*Max. In the two-interval example of FIG. 3A, the magnitude M in the interval $\beta=0$ to 0.5 may be approximated by M=$S_1$*Min+$K_1$*Max, or where the slope $S_1$=0.9807 and the intercept $K_1$=0.2382, M=0.9807*Min+0.2382*Max. The slope $S_1$ of 0.9807 may be approximated as binary 1 (1), minus binary 1⁄25 or (0.00001), plus binary 1⁄27 (or 0.0000001) plus binary 1⁄28 (or 0.00000001) and accordingly the number $S_1$*x (where x=Min) may be approximated by:

$$S_1=(x>>0)-(x>>5)+(x>>7)+(x>>8)$$

$$K_1=(x>>2)-(x>>6)+(x>>8)$$

This procedure rapidly calculates the desired magnitude values without "true" time-consuming multiplication steps. Similarly, a binary representation for the slope $S_2$=0.8091 and the ordinate intercept $K_2$=0.5951 for the second linear approximation interval 310 are:

$S_2=(x>>1)+(x>>2)+(x>>4)-(x>>8)$ $K_2=(x>>1)+(x>>4)+(x>>5)+(x>>9)$ where β=Min/Max is the abscissa 304, the ordinate 306 is in units of 1/Max. Accordingly, as indicated earlier, M can be calculated directly by multiplying β by Max, such that $M=S_1*Min+K_1*Max$ for the interval 308. These multiplications can be carried out by shifting and adding binary representation of the respective Max and Min values determined by the binary slope and intercept values for the interval.

The following C program code illustrates the use of such shifts to perform multiplications by powers of two. Simple binary "Multiplies" (multiplication operations by powers of 2) are represented by the <<symbol while simple binary "divides" (divide operations by powers of 2) are represented by >>. The following "C" program implements the previously described 2 interval approximation and arithlogic computation without the time penalty of "time" multiplication or division.

```
/*************************************************************
******
 * Fast Magnitude Spectrum Approximation without Multiply or Square
Root operations
 */
 void PowerSpectrum (long *npReal, long *npImag, long frame_size,
long *npPowerOut)
 {
        long re,im;
        while (frame_size-- > 0)
        {
            re = abs(*npReal++); /* get the abs val of the current real
and move ptr to next */
            im = abs(*npImag++); /* " for imaginary component */
            * 2 piece linear approx for npPowerOut[i] = sqrt
(re*re+im*im)
            * note that only 1 extra bit of precision is needed
            * (max (sqrt (re*re+im*im)) == max (re, im) *sqrt
(2) ==> 1 extra bit
            * equivalent code : :
            *    *npPowerOut++ = ((long) (sqrt(re*re+im*im)))
            */
            if (re>im)
            {
                    if ( (re>>1) > im)
                            *npPowerOut++ = (re-(re>>6) +
(im>>2)-(im>>6)+(im>>8));
                    else
                            *npPowerOut++ = (re-(re>>3)-
(re>>4)+(im>>1)+(im>>4)+(im>>5) );
            }
            else
            {
                    if ( (im>>1) > re)
                            *npPowerOut++ = (im-(im>>6)+(re>>2)-
(re>>6)+(re>>8));
                    else
                            *npPowerOut++ = (im-(im>>3)-
(im>>4)+(re>>1)+(re>>4)+(re>>5));
```

While the example of FIG. 3A has two linear approximation intervals, the number of approximation intervals may be more than 2, for increased accuracy. Illustrated in FIG. 3B is an example having 4 approximation intervals for increased accuracy in magnitude approximation. The following C program "powerapprox4interval" may be generated by the previous MATLAB program "GenerateEuclidApprox.M", with 4 approximation intervals over the range of β=[0, 1], as shown in FIG. 3B, for use in the speech processor system of FIG. 4.

```
POWERPROX4INTERVAL

/* Automatically Generated Euclid Approx file
 * by GenerateEuclidApprox.m MATLAB script
 * number of intervals used = 4
 * EuclidApprox(x0, y0, x1, y1) ~= sqrt( (x1-x0)^2 + (y1-y0)^2);
 */
#define LOCAL_ABS (x) ((x)<0?(-x):(x))
long EuclidApprox (long x0, long y0, long x1, long y1)
{
        long re;
        long im;
        re = LOCAL_ABS(x1-x0);
        im = LOCAL_ABS(y1-y0);
    if(re > im)
    {
                if ((re>>1) < im)
                {
                        if ((re>>2) < im)
                        {
                                dist = (re>>0)-(re>>7)+(re>>9)+(im>>3)-
(im>>9);
                        }
                        else
                        {
                                dist = (re>>0)-
(re>>4)+(im>>2)+(im>>4)+(im>>5)+(im>>8)+(im>>9);
                        }
                }
                else
                {
                        if ((re>>1)+(re>>2) < im)
                        {
                                dist =
(re>>1)+(re>>2)+(re>>4)+(re>>5)+(re>>7)-(re>>10)+(im>>1)+
(im>>5)-(im>>8) ;
                        }
                        else
                        {
                                dist =
(re>>1)+(re>>2)+(re>>8)+(im>>1)+(im>>3)+(im>>5) ;
                        }
                }
        }
        else
        {
            if ((im>>1) < re)
            {
                if ((im>>2) < re)
                {
                        dist = (im>>0)-(im>>7)+(im>>9)+
(re>>3)-(re>>9) ;
                }
                else
                {
                        dist = (im>>0)-
(im>>4)+(re>>2)+(re>>4)+(re>>5)+(re>>8)+(re>>9) ;
                }
            }
            else
            {
                if ((im>>1)+(im>>2) < re)
                {
                        dist =
(im>>1)+(im>>2)+(im>>4)+(im>>5)+(im>>7)-(im>>10)+
(re>>1)+(re>>5)-(re>>8) ;
                }
                else
                {
                        dist =
(im>>1)+(im>>2)+(im>>8)+(re>>1)+(re>>3)+(re>>5);
                }
            }
        }
        return dist; }
```

The error of the respective two interval and four-interval approximation as compared to the actual magnitude calculated as $M=\sqrt{Re^2+Im^2}$, may be plotted by the following Matlab program. These error plots are shown in registration with the graps of FIGS. 3A and 3B, respectively.

---

PLOTEUCLIDERROR

```
% PlotEuclidError.m
% This program automatically plots the error for the power spectrum
approximation
function PlotEuclidError (num_intervals, prec)
if (nargin < 2)
    fprintf('PlotEuclidError(number_of_intervals,prec) \n');
    return;
end
if (fix(log2(num_intervals)) ~= log2(num_intervals))
    fprintf('num_intervals must be a power of 2\n');
    return;
end;
x = 0:i\num_intervals:1;
coef = zeros(num_intervals,2);
for i = 1: num_intervals
    tx = x(i):0.0001:x(i+1);
    ty = (sqrt(1+tx.*tx));
    coef(i,:) = polyfit(tx,ty,1) % this computes the coefficients for
each segment of the approx
end
clear tx;
clear ty;
alpha = 0:0.0001:1.0;
d_euclid = (sqrt(1+alpha.*alpha));
d_approx = zeros(size(alpha));
interval_size = fix(length(alpha)\num_intervals);
i = 1;
for j = i:num_intervals
    d_approx(i:i+interval_size) = quick_quant(coef(j,2),prec) +
alpha(i:i+interval_size).*quick_quant(coef(j,1),prec);
    i = i + interval_size;
end
subplot (2,1,1)
plot(alpha,d_euclid, 'black',alpha,d_approx, 'red');
str = sprintf('Plot of Actual Euclidean with Approximation Using %d
Intervals Normalized to Beta [0.0–1.0]',num_intervals);
title (str);
subplot (2,1,2)
error = abs(d_euclid-d_approx);
plot(alpha,error,'blue');
title('Plot of Approximation Error normalized to Beta [0.0–1.0]');
fprintf('Peak Error = %f\n',max(error));
fprintf('RMS Error = %f\n',sqrt(sum((error.^2)) ./length(error)));
% =================================================
function quantized_num = quick_quant (num,prec_in_bits)
quantized_num = fix(num * (2^prec_in_bits));
quantized_num = quantized_num / (2^prec_in_bits);
```

---

The respective error plots for 2 interval and 4 interval approximations of magnitude are shown in FIGS. 3A and 3B, respectively, showing that despite the relative simplicity and high speed of the calculation, a relatively high degree of accuracy is provided.

Figure 5:
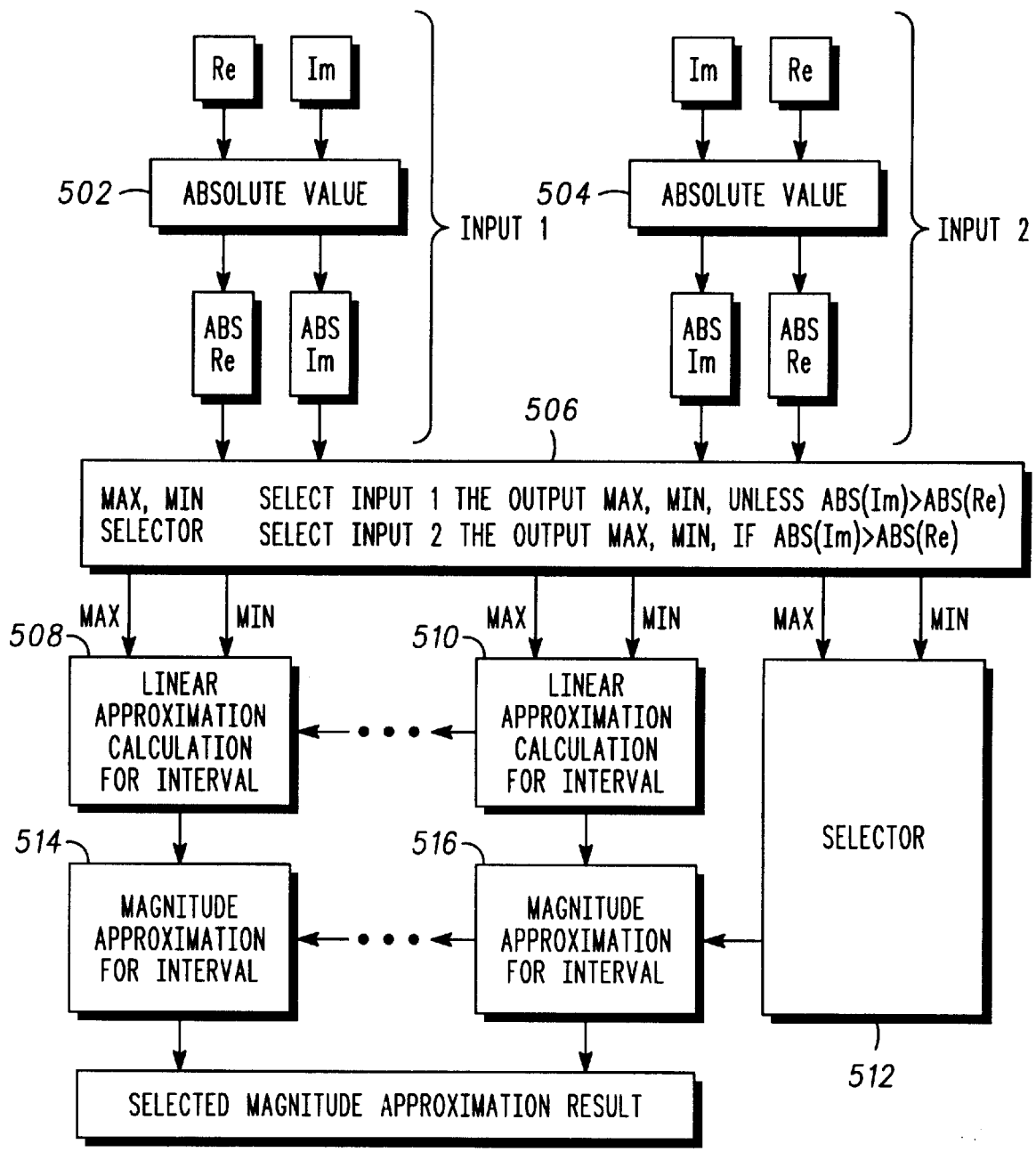
FIG. 5 is a schematic diagram of an embodiment of magnitude spectrum calculation hardware in accordance with the present invention.

While a programmed general purpose microprocessor is a preferred implementation, specialized hardware may also be used. FIG. 5 is a schematic illustration of a special purpose DSP system 500 for rapid magnitude approximation. The DSP system 500 utilizes clocked pipelined flow (from top to bottom of the FIGURE) which optimizes speed by parallel processing of data to permit solution of potentially different results while reducing serial comparison delays.

As shown in FIG. 5, each set of the digital number pairs Re, Im are input to the systems both as Re, Im, and as the reverse pair Im, Re. These two sets of input are clocked to simple respective absolute value determination processors 502, 504 to produce Input 1 and Input 2 to Max, Min selector 506, which is also a simple logic array. The Max, Min selector 506 selects Input 1, abs(Re, Im) as its output unless the absolute value of Im is greater than the absolute value of Re, in which case it selects Input 2, abs(Im, Re), as its output. The outputs of Max, Min selector 506 are Max, Min values as previously described with respect to FIGS. 2 and 3.

The Max, Min values serve as simultaneous pipeline-clocked inputs to two or more linear interval approximators 508, 510 and interval selector 512. There is an interval approximator for each selected interval of $\beta$ from 0 to 1, as previously described. For the two-interval example, linear approximator 508 will rapidly approximate the magnitude using a linear approximation as previously described using a best fit line over the interval $\beta=0$ to 0.5, to produce a magnitude approximation output in a suitable memory register 514. At the same time, linear approximator 510 is approximating the magnitude for the same Max, Min input using a different best fit line slope and intercept for the interval of $\beta=0.5$ to 1.0, to produce a magnitude approximation output 514 for this interval in a suitable memory register 516. Simultaneously, the interval selector 512 uses the Max, Min input to select the interval of $\beta=0$ to 0.5, or 0.5 to 1.0, for the particular values of $\beta=\text{Min}/\text{Max}$. The interval selector 512 selects which output register 514, 516 contains the proper magnitude approximation for the system output. For increased numbers of intervals along A, additional linear approximations may be used, as shown in FIG. 5, each of which has stored its respective slope and intercept data.

Whether a dedicated processor or programmed processor is used, the magnitude approximator 426 produces a digitized magnitude vector output signal 428. The frequency magnitude spectrum signals 428 may be further processed to delete the low frequency components of the magnitude spectrum which contain minimal recognition information. The useful frequency band typically is between about 64 Hz and about half of the actual sampling frequency. Mel sum filter 430 deletes the low frequency spectral components, and combines the frequency magnitude data 428 into a relatively small number of channels. Typically, the frequency data is divided into 23 channels equidistant in mel frequency domain. Each channel has triangular-shaped frequency window, with consecutive channels being half-overlapping.

In a speech processing system which is consistent with the emerging Aurora standard, the choice of the starting frequency of the filter bank, $f_{start}=64$ Hz, approximately corresponds to the case where the full frequency band is divided into 24 channels and the first channel is discarded using any of the three previously described sampling frequencies.) The center frequencies of the channels in terms of Fast Fourier Transfer (FFT) bin indices ($cbin_i$ for the ith channel) may be calculated as follows, $$Mel\{x\} = 2595 \cdot \log_{10}\left(1 + \frac{x}{700}\right),$$

$$f_{c_i} = Mel^{-1}\left\{Mel\{f_{start}\} + \frac{Mel\{f_s/2\} - Mel\{f_{start}\}}{23+1} i\right\},$$

$$i = 1, \ldots, 23,$$

$$cbin_i = round\left\{\frac{2f_{c_i}}{f_s}\left(\frac{FFTL}{2} + 1\right)\right\}.$$

The 1999 revisions to the emerging Aurora standard provided an alternative definition of this processing, as follows:

$$cbin_i = \text{round}\left\{\frac{f_{c_i}}{f_s} FFTL\right\}.$$

where round(.) defines rounding towards the nearest integer. The output 432 of the mel filter 430 is the weighted sum of the FFT magnitude spectrum values ($bin_i$) in each band. Windowing, such as triangular, half-overlapped windowing, may be used as follows, $$fbank_k = \sum_{i=cbin_{k-1}}^{cbin_k} \frac{i-cbin_{k-1}}{cbin_k - cbin_{k-1}} bin_i + \sum_{i=cbin_k+1}^{cbin_{k+1}} \left(1 - \frac{i-cbin_k}{cbin_{k+1} - cbin_k}\right) bin_i,$$

The 1999 revisions to the emerging Aurora standard provided an alternative definition of this processing, as follows:

$$fbank_k = \sum_{i=cbin_{k-1}}^{cbin_k} \frac{i-cbin_{k-1}+1}{cbin_k - cbin_{k-1}+1} bin_i + \sum_{i=cbin_k+1}^{cbin_{k+1}} \left(1 - \frac{i-cbin_k}{cbin_{k+1} - cbin_k + 1}\right) bin_i,$$

where k=1, . . . , 23, $cbin_0$ denotes the FFT bin index corresponding to the starting frequency, i.e., $$cbin_0 = \text{round}\left\{\frac{2f_{start}}{f_s}\left(\frac{FFTL}{2}+1\right)\right\},$$

The 1999 revisions to the emerging Aurora standard provided an alternative definition of this processing, as follows:

$$cbin_0 = \text{round}\left\{\frac{f_{start}}{f_s} FFTL\right\},$$

$$cbin_{24} = \text{round}\left\{\frac{f_s}{f_s} FFTL\right\} = FFTL$$

and $cbin_{24}$ equals to FFTL/2+1, i.e. the FFT bin index corresponding to half of the sampling frequency.

Because the magnitude data is combined into a relatively small number of channels, a very significant reduction in the total amount of data being processed is provided for in subsequent operations, which may be conventional processors or processing steps, as will now be described.

In this regard, the reduced data output 432 of the mel sum filter 430 may be transformed in a nonlinear manner to make the processed speech data more amenable to comparison and recognition processes. The mel channel data is log-transformed by log processor 434, so that the data 432 is converted to its ln value as follows:

$$f_i = \ln(fbank_i), i=1, \ldots, 23.$$

A signal "floor" may be applied as previously discussed for energy calculation. For example, the log filter bank outputs may be provided with a "floor" value so that they cannot be smaller than a predetermined lower limit, such as −50.

As indicated, in the illustrated Aurora-based system, a relatively small number of cepstral coefficients, e.g., 13 cepstral coefficients, are calculated from the nonlinear transform output signals 436 of the log processor 434, to provide a digital cepstral signal 438. It may typically be desired to transform the cepstral channel data to obtain more generally comparable speech information, and, in this regard, a discrete cosine transform may be performed on the digital signal 436 by discrete cosine transform processor 438, to provide a DCT transformed digital data signal 440:

$$c_i = \sum_{j=1}^{23} f_j \cdot \cos\left(\frac{\pi \cdot i}{23}(j-0.5)\right), \quad 0 \le i \le 12.$$

As noted in the Aurora Standard, the C0 coefficient may be redundant when the energy coefficient 417 is used. The bit stream format may be structured with several optional transmission modes so that only one of these two coefficients or both of them are transmitted depending on the available bandwidth. Accordingly, the speech recognition embodiment of FIG. 4 is illustrated for use of either energy signal 417 or discrete cosine transform coefficient C0.

Liftering may, if desired, be applied to the 13 cepstral coefficients by processor 442.

$$C_n = \left(1 + \frac{P}{2} \cdot \sin\left(\frac{\pi \cdot n}{P}\right)\right) \cdot c_n, \quad 0 \le n \le 12, \quad P=22.$$

The final feature vector accordingly may comprise up to 14 components: the log-energy component and the 13 cepstral components 444. The digital data of these feature vectors may be compressed in an appropriate manner, in feature data compressor 446, and the compressed data 448 may be suitably framed for bit streaming to comparison engine 450. The comparison engine 450 compares the feature vectors with fixed or dynamically stored feature vectors 452 of known words, phrases or other sounds, to output a speech recognition or comparison signal, in accordance with conventional machines as indicated in FIG. 4.

A feature vector normalizer may be used in the comparison engine 450 to provide normalized feature values which may correspond with template feature vectors to determine which of the template feature vectors most resembles the normalized feature vectors. In addition to individual words or phrases, sets of template feature vectors representing larger phrases or commands may be stored in a template feature vector library 452, as indicated, in a variety of ways, such by computing one or more distance metrics or correlating functions between the normalized feature vectors and each of the sets of template feature vectors. The template feature vectors having the minimum distance metric or closest correlation in a best-fit match may be used to select recognition elements.

There are many techniques known to those skilled in the art of speech recognition which may be used to determine feature vectors. The techniques include Linear Predictive Coding (LPC) Coefficients, Cepstral Coefficients, Log Area Ratios, and Mel Scale Filterbank Coefficients. The preferred embodiment of the present invention utilizes Mel Scale and cepstral processing, although the magnitude approximation aspects of the present invention will operate with other feature vector techniques, such as those listed above.

In Mel Scale Filterbank voice recognition systems, the sound signal samples for an analysis frame are passed through a high frequency pre-emphasizing filter which increases the relative energy in the high frequency components as compared to the energy of the low frequency components. The pre-emphasized sound signal samples for each analysis frame are bandpass filtered by a series of filters covering different frequency bands. The filters may be applied in any computational manner desired in either the time domain or the frequency domain. In preferred embodiments, the filters are applied in the frequency domain. A magnitude spectrum may be used instead of the conventional power spectrum of the pre-emphasized sound signal samples in the analysis frames.

After the values for the magnitude spectrum are determined, band-pass filters may be applied in the frequency domain by a filter weighting value for each of the power spectrum values such as a raised cosine weighting profile.

The frequency bands for each band-pass filter, utilize a Mel or Bark scale along the frequency axis which approximates the frequency response of the human ear. The frequency bands are approximately linearly spaced from 0 to 1 KHz, and logarithmically spaced above 1 KHz, although other filter spacings may also be used.

While the previous example utilizes a complex Fourier transform, efficient approximations of magnitude spectra of other complex transforms may also be utilized for speech recognition, and other pattern recognition and processing in accordance with the present invention. Similarly, magnitude spectra of complex transform may be used in a variety of image processing applications.

Mellin type transforms of the log-spectrum of a speech signal can provide a scale invariance property which decreases sensitivity to the variation of the vocal tract length among individual speakers, as an alternative to cepstrum analysis for speaker-independent speech recognition. (J. Chen, et al., "A Novel Robust Feature of Speech Signal Based on the Mellin Transform for Speaker-independent Speech Recognition", p. 629, Paper #1144, ICASSP98 Robust Features for Automatic Speech Recognition).

Magnitude spectra are also useful for "automatic" indexing and retrieval of image data, such as digitally stored images and video sequences. Translation invariance may be obtained by computing the Fourier magnitude spectrum and transforming it from Cartesian to a logarithmic-polar representation to map rotation and scaling transformations into shifts in the transformed space. These quasi-invariant properties are preserved under projection of this 2-D representation onto two I-D normalized orthogonal subspaces to describe, respectively, the probability density of the image's spectrum coefficients with respect to the orientation and scale. Invariance to rotation and scaling may be achieved by computing the Fourier power spectrum of these vectors, and by suppressing their even-symmetry components.

In such aerospace systems, and in a variety of other applications such as vector-oriented display and data processing systems, it may be desirable to convert Cartesian coordinate information into cylindrical or spherical coordinate information, or vice versa. The present invention may be utilized iteratively to quickly convert large amounts of display or other information between coordinate systems. For example, as shown in FIG. 9, a Cartesian data point (x, y, z) can be converted to a data point in cylindrical coordinates [r, β, z] by calculating the magnitude and angle β of the vector R as previously described.

The magnitude of the vector R may be approximated by first approximating the magnitude of the [x, y] vector $M = \sqrt{(X_2)^2 + (Y_1)^2}$, followed by approximately the magnitude of the [x, y, z] vector $R = \sqrt{M^2 + Z^2}$. The angle β may be approximated as previously described. Similarly, the spherical coordinates [r, θ, φ] may be rapidly approximated in a similar manner. In this regard, the approximation although rapid may be relatively accurate. The following Matlab program plots the respective error, as shown in FIGS. 8A and 8B, of the actual arctangent function, as compared to the illustrated examples of two segment approximations (FIG. 8A) and 4-segment representations (FIG. 8B) there shown:

---

PLOTARCTANERROR

```
% PlotArcTanError.m
% This program automatically plots the arctan approximation
function PlotEuclidError (num_intervals,prec)
if (nargin < 2)
    fprintf('PlotEuclidError(number_of_intervals,prec) \n') ;
    return;
end
if (fix(log2(num_intervals)) ~= log2(num_intervals))
    fprintf('num_intervals must be a power of 2\n');
    return;
end;
x = 0:1\num_intervals:1;
d_arctan = (sqrt(1+x.*x));
coef = zeros(num_intervals,2);
for i = 1: num_intervals
    tx = x(i):0.0001:x(i+1);
    ty = (atan (tx)) ;
    coef(i,:) = polyfit(tx,ty,1) % this computes the coefficients for
each segment of the approx
end
clear tx;
clear ty;
alpha = 0:0.0001:1.0;
d_arctan = (atan(alpha));
d_approx = zeros(size(alpha));
interval_size = fix(length(alpha)\num_intervals);
i = 1;
for j = 1:num_intervals
    d_approx(i:i+interval_size) = quick_quant(coef(j,2),prec) +
alpha(i:i+interval_size).*quick_quant(coef(j,1),prec);
    i = i + interval_size;
end
subplot (2,1,1)
plot(alpha,d_arctan, 'black',alpha,d_approx, 'red');
str = sprintf('Plot of Actual Arctan with Approximation Using %d
Intervals Normalized to Beta [0.0–1.0] ',num_intervals);
title (str);
subplot (2,1,2)
error = abs(d_arctan−d_approx);
plot (alpha,error,'blue');
title('Plot of Approximation Error normalized to Beta [0.0–1.0]');
fprintf('Peak Error = %f\n',max(error));
fprintf('RMS Error = %f\n',sqrt(sum((error.^2))./length(error)));
% ================================================
function quantized_num = quick_quant (num,prec_in_bits)
quantized_num = fix(num * (2^prec_in_bits));
quantized_num = quantized_num / (2^prec in bits);
```

---

U.S. Pat. No. 5,806,031 assigned to Motorola, Inc. and incorporated herein by reference, describes a tonal sound recognizer which determines tones in a tonal language without the use of voicing recognizers or peak picking rules. The tonal sound recognizer computes feature vectors for a number of segments of a sampled tonal sound signal in a feature vector computing device, compares the feature vectors of a first of the segments with the feature vectors of another segment in a cross-correlator to determine a trend of a movement of a tone of the sampled tonal sound signal, and uses the trend as an input to a word recognizer to determine a word or part of a word of the sampled tonal sound signal.

In utilizing the present methods for tonal speech recognition, a tonal speech signal may be sampled, and feature vectors may be computed for a number of segments of the sampled tonal sound signal wherein the feature vectors contain information describing a tonal trend of the sampled tonal sound signal.

The feature vectors of a first of the number of segments may be compared with the feature vectors of a second of the number of segments to determine a trend of a movement of a tone of the sampled tonal sound signal and the trend may be used as an input to a recognizer to determine a word or part of a word of the sampled tonal sound signal.

The computation of feature vectors may involve computing Fourier or Mellin transform magnitude vectors, or cepstral or Mel vectors, for each of the number of segments, as described above, and as described in the '031 patent. It is noted that while the approximated magnitude spectra may be squared to give a conventional power spectra, such squaring operation is computationally intensive and may be omitted.

U.S. Pat. No. 5,842,162 assigned to Motorola, Inc. and incorporated herein by reference, describes a sound recognizer using a feature value normalization process to substantially increase the accuracy of recognizing acoustic signals in noise. The sound recognizer includes a feature vector device which determines a number of feature values for a number of analysis frames, a min/max device which determines a minimum and maximum feature value for each of a number of frequency bands, a normalizer which normalizes each of the feature values with the minimum and maximum feature values resulting in normalized feature vectors, and a comparator which compares the normalized feature vectors with template feature vectors to identify one of the template feature vectors that most resembles the normalized feature vectors.

Aspects of the present invention may also find utility in systems for efficient frequency spectrum analysis, for example, such as those described in U.S. Pat. No. 4,031,462, assigned to Motorola, Inc., for aerospace applications such as missile guidance systems, which is hereby incorporated by reference. For such systems, real-time analysis of the frequency spectrum of an incoming signal of unknown frequency characteristics with minimum size, power consumption and weight is important. Such apparatus for analyzing in real time the frequency spectrum of an incoming signal of unknown frequency characteristics may comprise means for sampling and digitizing and storing the incoming signal over a predetermined sampling time period, means for generating a complex transition of the digitized signal data into the frequency domain in rectangular form and means for transposing the rectangular form frequency domain data into magnitude and phase form, as previously described.

It will also be appreciated that aspects of the present invention may be utilized to rapidly convert between carestian and magnitude based coordinate systems for a variety of applications, particularly those involving large data sets which must be transformed in "real time", such as cad/cam displays and aerospace position indicators.

The relationship between cartesian, polar, cylindrical and spherical coordinate systems with the origins x, y, z=0, r, $\theta$=0; R, $\theta$, z=0; R, $\theta$, $\phi$=0 being coincident for all four coordinate systems, is further described. The positive z -axes of the cartesian and cylindrical and spherical systems coincide with the positive x -axis of the Cartesian system, and the rays $\theta$=90° coincide with the positive y -axis. The Cartesian coordinates (x, y, z), the r, $\theta$, cylindrical coordinates (r, $\theta$, z) and the spherical coordinates (R, $\phi$, $\theta$) of a point (or vector) 902 are related as follows: Cartesian to polar or cylindrical:

$$r = \sqrt{x^2 + y^2},$$
$$\theta = \arctan\frac{y}{x},$$

Cartesian to spherical:

$$R = \sqrt{x^2 + y^2 + z^2}$$
$$\theta = \arctan\frac{y}{x},$$
$$\phi = \arctan\frac{\sqrt{x^2 + y^2}}{z},$$
$$\phi = \arccos\frac{z}{\sqrt{x^2 + y^2 + z^2}}$$

Polar, polar and cylindrical coordinates r, $\theta$ may be rapidly approximated as previously described for magnitude M and phase $\theta$ approximation. For spherical coordinate determination, the coordinate R may be determined by interating the approximation of magnitude in two steps. For example, the magnitude of M=$\sqrt{x^2+y^2}$ may be determined as previously described, and subsequently the magnitude of R=$\sqrt{m^2+z^2}$ may be approximated. Similarly, the angle of $\phi$ may be determined in two steps, by approximating either of the above formulae.

While the present invention has been described with respect to various specific embodiments and examples, it will be appreciated that a wide variety of modifications, adaptations and derivations may be made which are within the spirit and scope of the present invention as defined by the following claims and equivalents thereof.

What is claimed is:

1. A method for a voice pattern recognition and processing system comprising the steps of:

receiving voice input to establish a complex number pair Re, Im;

selecting the larger absolute value number Max and the smaller absolute value number Min from the Re, Im pair;

determining in which of one or more pre-selected intervals, the ratio $\beta$=Min/Max lies in the range of from zero to one the complex number pair;

providing one or more substantially linear approximations of the curve $\sqrt{1+\beta^2}$ over one or more preselected intervals of $\beta$=Min/Max;

approximating the magnitude of the Re, Im pair by determining the value of its linear approximation in the selected interval; and generating voice recognition output based on the approximated magnitude of the Re, Im pair.

2. A method in accordance with claim 1 wherein the range of $\beta$ includes the range of 0 to 1, wherein the number of intervals of $\beta$ from 2 to 8, and wherein the one or more linear approximations of said curve in the selected intervals is fit to said curve to substantially minimize error over the range of the selected interval.

3. A method in accordance with claim 1 wherein the respective magnitudes of an array complex number pairs of time-domain-transformed data of the voice input are calculated, and wherein the linear approximations are carried out substantially in accordance with the function M=Slope*Min+K*Max, where the Slope and intercept constant K are different for each of the selected approximation intervals, and wherein Slope times Min is calculated by simple arithlogic combination of (positive or negative) binary shifted values of Min and Max, and intercept constant K times Max is calculated by simple arithlogic combination of (positive or negative) binary shifted values of Max.

4. A method in accordance with claim 1 wherein the linear approximation is a substantially least squares fit over the selected interval, and wherein the phase θ of the complex number pair is also approximated as a linear approximation of the function arctangent (Min/Max) in said preselected interval of β.

5. A voice pattern recognition and processing system comprising:

- means for receiving voice input to establish a number pair Re, Im;
- means for determining Max=Max[abs(Re, Im)] based on the number pair Re, Im;
- means for determining Min=Min[(abs(Re, Im)] based on the number pair Re, Im;
- means for selecting one of at least two predetermined intervals of Min/Max in the range of from 0 to 1;
- means for using substantially arithlogic operations to approximate a magnitude M of the number pair, Min, Max as a linear approximation proportional to $\sqrt{1+\beta^2}$ over the selected interval; and
- means for generating voice recognition output based on the approximated magnitude of the number pair Re, Im.

6. The voice pattern recognition and processing system in accordance with claim 5 further comprising means for approximating the phase of the complex number pair, Re, Im, as a linear approximation of arctangent (Min/Max).

* * * * *